(12) United States Patent
von der Ahé et al.

(10) Patent No.: US 12,306,843 B1
(45) Date of Patent: May 20, 2025

(54) CONDITIONAL BLOOM FILTERS REPRESENTING FIELD ALIASING

(71) Applicant: CrowdStrike, Inc., Sunnyvale, CA (US)

(72) Inventors: Peter von der Ahé, Aarhus (DK); Mikkel Milo Tromborg Nielsen, Aarhus (DK); Erik Søe Sørensen, Skanderborg (DK)

(73) Assignee: CrowdStrike, Inc., Sunnyvale, CA (US)

( * ) Notice: Subject to any disclaimer, the term of this patent is extended or adjusted under 35 U.S.C. 154(b) by 0 days.

(21) Appl. No.: 18/764,519

(22) Filed: Jul. 5, 2024

(51) Int. Cl.
*G06F 16/2458* (2019.01)
*G06F 11/34* (2006.01)
*G06F 16/242* (2019.01)
*G06F 16/2455* (2019.01)

(52) U.S. Cl.
CPC ...... *G06F 16/2465* (2019.01); *G06F 11/3419* (2013.01); *G06F 16/242* (2019.01); *G06F 16/2455* (2019.01)

(58) Field of Classification Search
CPC .................................................. G06F 16/2465
See application file for complete search history.

(56) References Cited

U.S. PATENT DOCUMENTS

| | | |
|---|---|---|
| 10,990,572 B1 | 4/2021 | Leighton |
| 11,593,477 B1 | 2/2023 | Thimmegowda et al. |
| 2014/0188840 A1* | 7/2014 | Agarwal ............. G06F 16/2228 707/711 |
| 2016/0063021 A1 | 3/2016 | Morgan et al. |
| 2018/0089328 A1* | 3/2018 | Bath ................... G06F 16/9538 |
| 2022/0014467 A1 | 1/2022 | Cheruvu et al. |
| 2022/0335156 A1* | 10/2022 | Raphael ................. G06F 16/25 |

FOREIGN PATENT DOCUMENTS

| | | |
|---|---|---|
| CN | 116360954 | 12/2023 |
| CN | 117472875 | 1/2024 |

\* cited by examiner

*Primary Examiner* — Van H Oberly
(74) *Attorney, Agent, or Firm* — Law Office of Scott P. Zimmerman, PLLC

(57) ABSTRACT

Conditional Bloom filters improve computer functioning when membership testing different data sets. Today's cloud service providers maintain large, distributed datasets often incorporating or absorbing data having different labels and schemes. Nearly all cloud service providers, for example, utilize one or more different log vendors/providers that use different data conventions. The conditional Bloom filters resolve these vendor differences using field aliasing that relates vendor-specific field names to their corresponding common or alias field names. Each vendor's unique dataset may be mapped or normalized to a common scheme, thus ensuring that membership testing using the conditional Bloom filters retains precision and improves computer functioning in the presence of aliases.

20 Claims, 16 Drawing Sheets

CONDITIONAL BLOOM FILTERS REPRESENTING FIELD ALIASING

BACKGROUND

The subject matter described herein generally relates to computers and to database structures and, more particularly, the subject matter relates to query processing.

Searching data is hardware intensive. As cloud computing grows in usage, computer databases have grown exceptionally large. It is common, for example, for a cloud-distributed database to process and store ten million (10,000,000) messages per second. Each day, then, cloud-distributed databases store massive amounts of data that consume petabytes of memory storage. Because these exceptionally large databases must be searched, data lookups require much time and hardware resources.

SUMMARY

A new and elegant conditional Bloom filter greatly improves computer functioning.

Today's cloud service providers maintain large, distributed datasets that incorporate or absorb data having different labels and schemes. Nearly all cloud service providers, for example, utilize one or more different log vendors/providers, and each different log vendor/provider may use a different data convention. The conditional Bloom filter is generated to resolve these different data conventions. The conditional Bloom filter represents field aliasing that converts entity-specific field names to their corresponding common, alias field names. So, whatever the log vendor's data convention, the conditional Bloom filter may be membership tested to Bloom filters representing the common, alias field names. The conditional Bloom filter thus effectively represents membership testing using one or more conditional statements representing the field aliasing. Indeed, field aliasing and membership testing using the conditional Bloom filter results in a 7× reduction in processor runtimes.

BRIEF DESCRIPTION OF THE SEVERAL VIEWS OF THE DRAWINGS

The features, aspects, and advantages of conditional Bloom filters representing field aliasing are understood when the following Detailed Description is read with reference to the accompanying drawings, wherein.

DETAILED DESCRIPTION

Figure 1:
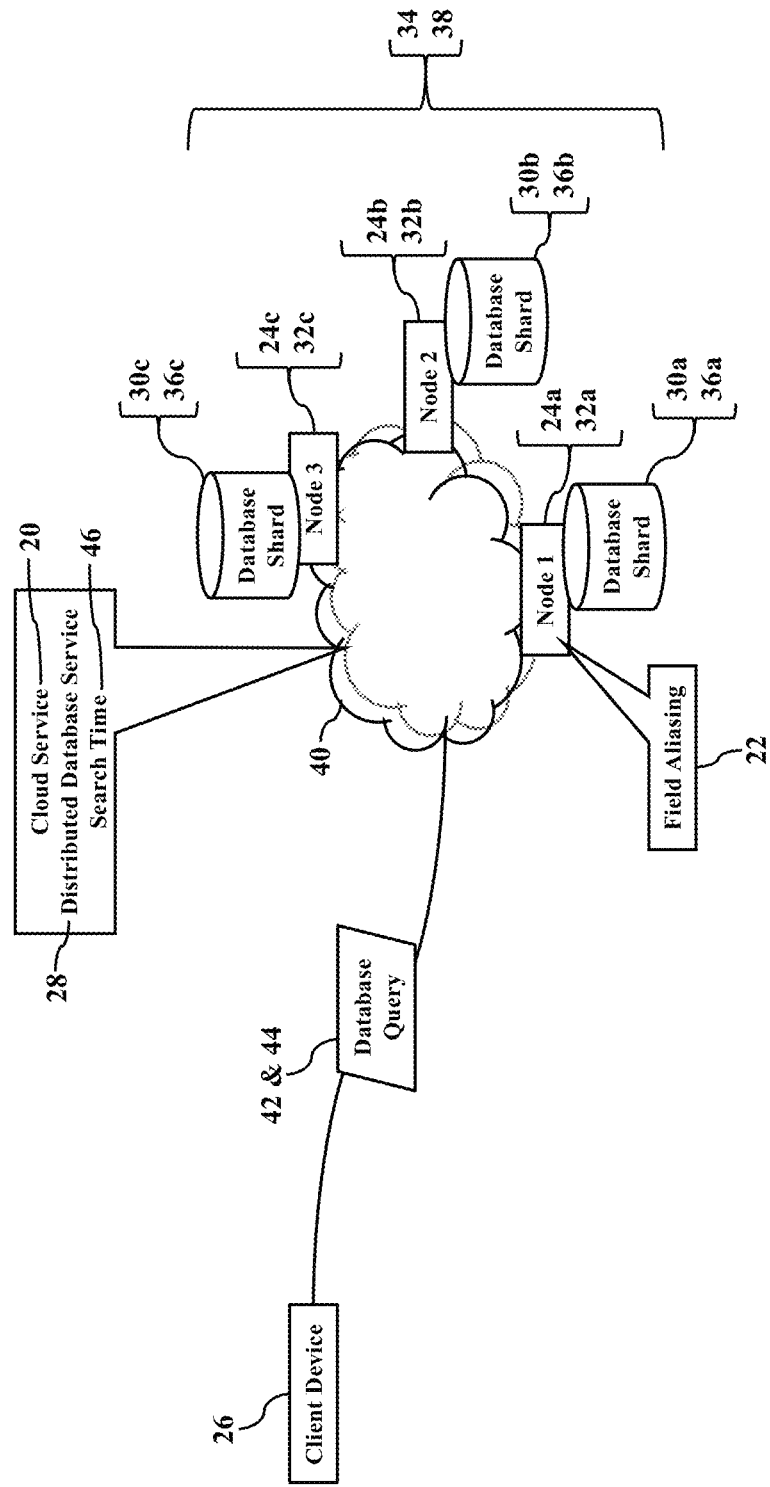
FIGS. 1-3 illustrate some examples of a cloud service using field aliasing.

Searches of computer databases require significant computing/processing/storage resources. A computer database is stored within a server, a smartphone, or other computer system. The computer database stores hundreds, thousands, millions, or more of electronic records (such as movies, music, computer/network/security event log data, documents, or other electronic files). Whatever the electronic records, the computer database may be very large, especially in cloud computing environments. Because many databases are large, these large databases burden processors and memory devices. Large databases are slow to search, as the hardware processor and the memory device require more operations and more time. Large databases require more electrical power, as the hardware processor and memory device consume more electricity when performing searches. Large databases also consume more memory/storage space, which further bogs down performance. As a general rule, then, as databases grow in size, their costs also grow.

Some examples relate to database field aliasing. Because large databases store massive amounts of data, the data is often associated with different software applications, different users, different employers, and other entities. Indeed, NETFLIX®, AMAZON®, GOOGLE®, HULU®, and other cloud services maintain very large databases that collect massive amounts of data according to services, devices, vendors, customers, and other entities. Indeed, because the database may serve hundreds, thousands, or even millions of different users and customers, the database may receive millions of database queries, and the database queries may specify many different standards, formattings, and nomenclatures. The field aliasing, though, standardizes and normalizes the database queries. The field aliasing overcomes the formatting and terminology differences between the database queries. The field aliasing, for example, converts entity-specific field names used by NETFLIX® into common alias names that are generic or standardized across entities. The field aliasing, as more examples, converts entity-specific field names used by AMAZON® or GOOGLE® into their common alias names that are generic or standardized across entities. The field aliasing overcomes unique terms, labels, and titles used by different services, devices, vendors, customers, and other entities. The field aliasing allows computers to provide faster search results while using less hardware resources and less electrical power.

Some examples further relate to membership testing. Because the field aliasing overcomes formatting and terminology differences between entities, the field aliasing further improves computer functioning. Because a database query may be preprocessed using the field aliasing, a new and elegant conditional Bloom filter may be generated to further speed-up search results. The conditional Bloom filter can substantially reduce the burdens associated with a computer database or other datastore. A computer system is programmed to generate the conditional Bloom filter as a representation of the database query that was preprocessed using the field aliasing. So, when the computer system needs to perform a search of the computer database, the computer system, instead, first conducts a preliminary membership test using the conditional Bloom filter. The computer system compares the conditional Bloom filter to a binary bit-set membership representation of the computer database. The preliminary membership test quickly and inexpensively reveals whether the conditional Bloom filter is a member of Bloom filters representing the computer database. If the preliminary membership test is negative (i.e., the conditional Bloom filter is not a member of the Bloom filters representing the computer database), then the computer system may immediately decline to search the larger computer database. That is, because the conditional Bloom filter is not a member of the Bloom filters representing the computer database, there is no need, reason, or advantage in searching the much larger byte-sized computer database. The computer system, in other words, would waste time, energy, and cost searching the larger computer database. However, if the preliminary search is positive (i.e., the conditional Bloom filter might be a member of the Bloom filters representing the computer database), then the computer system may perform a more thorough search of the larger computer database. In other words, because the preliminary membership test is satisfied, the time, energy, and cost of searching the larger computer database is justified. The new and elegant conditional Bloom filter is thus designed to make a quick and simple go-no-go decision for a more expensive and resource-intensive search of the larger computer database.

Conditional Bloom filters representing field aliasing will now be described more fully hereinafter with reference to the accompanying drawings. The concepts and schemes for conditional Bloom filters representing field aliasing, however, may be embodied and implemented in many different forms and should not be construed as limited to the examples set forth herein. These examples are provided so that this disclosure will be thorough and complete and fully convey conditional Bloom filters representing field aliasing to those of ordinary skill in the art. Moreover, all the examples of conditional Bloom filters representing field aliasing are intended to encompass both structural and functional equivalents thereof. Additionally, it is intended that such equivalents include both currently known equivalents as well as equivalents developed in the future (i.e., any elements developed that perform the same function, regardless of structure).

Figure 2:
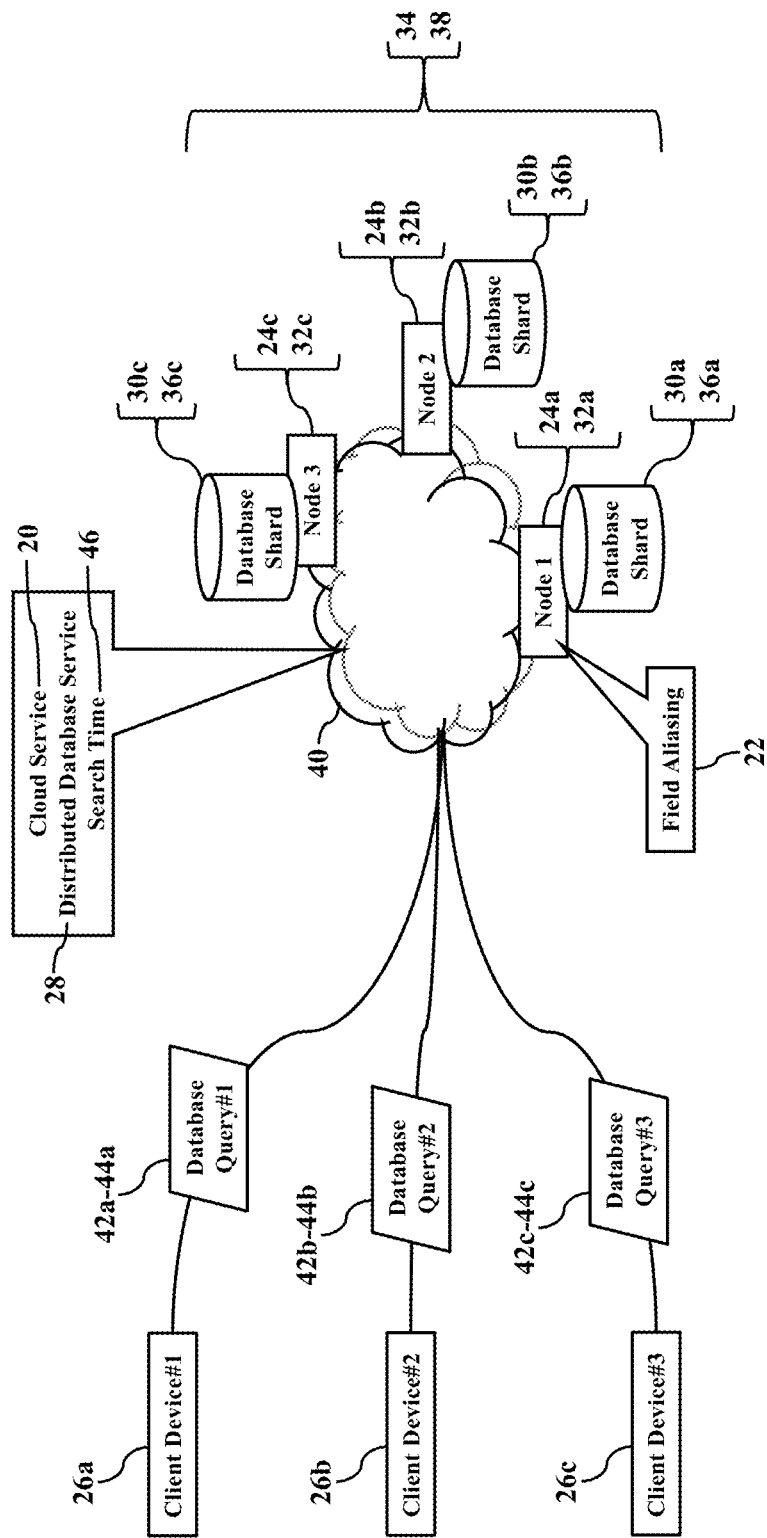
Figure 3:
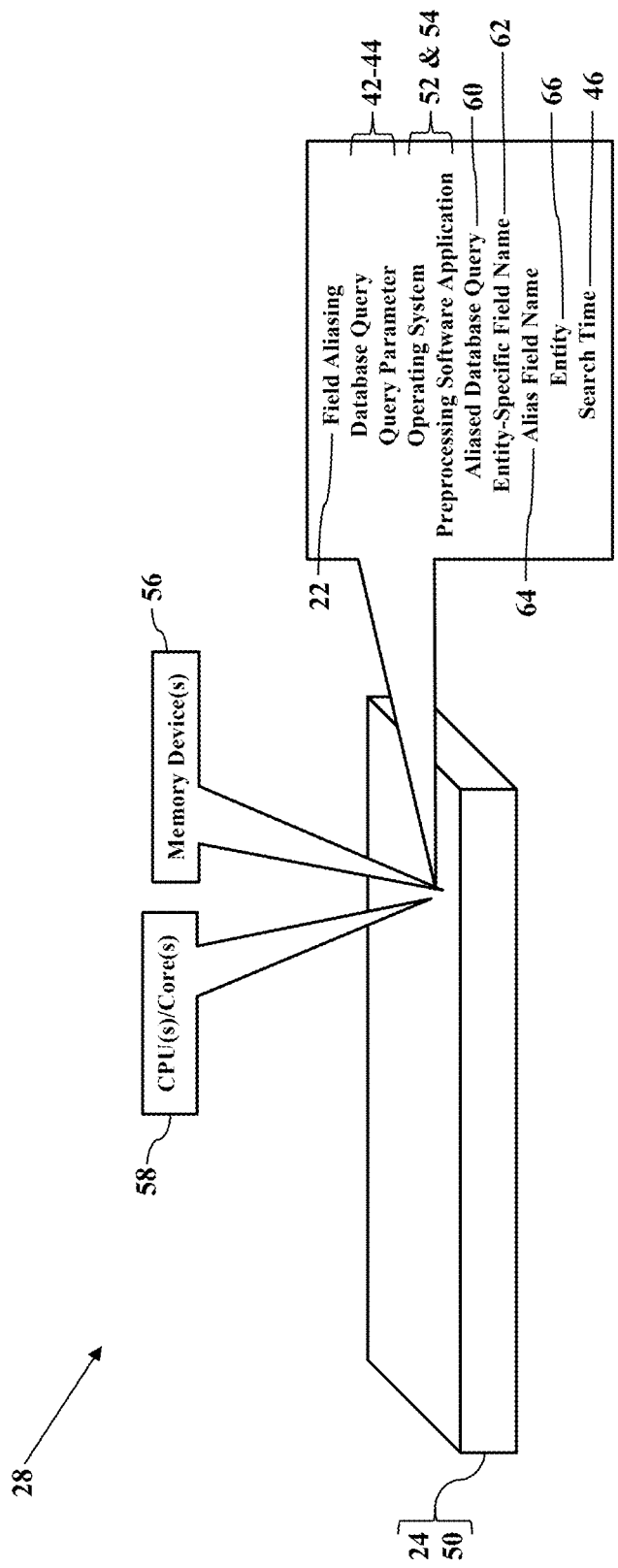

FIGS. 1-3 illustrate some examples of a cloud service 20 using field aliasing 22. One or more computer systems 24 provide at least a portion of the cloud service 20 to a client device 26. While the computer system(s) 24 may provide a wide variety of cloud services 20 to the client device 26, FIG. 1 illustrates a cloud-based distributed database service 28. That is, the distributed database service 28 may be offered or provided by a service provider, and the distributed database service 28 distributes and stores electronic data 30 among computing nodes 32 (perhaps associated with a computing cluster 34). Each computing node 32 is also an example of the computer system 24, and each computing node 32 locally stores at least a portion or shard 36 of a distributed database 38. The distributed database service 28 may have many, perhaps even hundreds, of the computing nodes 32 associated with the cluster 34. Such a large number of the computing nodes 32, though, is too difficult to illustrate. For simplicity, then, FIG. 1 only illustrates three (3) computing nodes (illustrated as reference numerals 32a, 32b, and 32c). The computing nodes 32a-c may communicate via a cloud computing networking environment 40.

The cloud-based distributed database service 28 provides search results. Because the distributed database service 28 may store days, months, and even years of the electronic data 30, the client device 26 may submit a database query 42. The database query 42 requests a search of the distributed database 38 according to a query parameter 44. The distributed database service 28 then causes each computing node 32a-c to search its local shard 36a-c for the query parameter 44 specified by the database query 42. As the reader likely understands, though, searches of large databases can take many seconds to accomplish. Indeed, as the distributed database 38 may have hundreds of the computing nodes 32 and store many petabytes (e.g., 250 bytes or millions of gigabytes) of the electronic data 30, a search time 46 for answering the database query 42 may be excessive and result in query timeouts and/or unfavorable user experiences.

The cloud-based distributed database service 28 thus preprocesses the database query 42 to improve computer functioning. While one or more of the computing nodes 32 may preprocess the database query 42, FIG. 1 simply illustrates the computer system/node 24a/32a. When the distributed database service 28 receives the database query 42, nodal members of the distributed database service 28 may forward the database query 42 to the computer system 24a. That is, prior to executing the database query 42 on the distributed database 38, the computer system 24a preprocesses the database query 42 by performing the field aliasing 22. The field aliasing 22 normalizes the database query 42 to standard formatting and terminology.

As FIG. 2 illustrates, the distributed database service 28 must adapt to formatting and terminology differences. Because the distributed database service 28 may store many different users' and customers' electronic data 30, each user's/customer's electronic data 30 may have different formatting and terminology. Moreover, the distributed database service 28 may receive many different database queries 42, and each database query 42 may use different standards, formatting, and nomenclature. Database query #1 (illustrated as reference numeral 42a), for example, may be formatted, named, or specified according to the MICROSOFT AZURE MONITOR® service. Database query #2 (illustrated as reference numeral 42b), however, is formatted, named, or specified according to the PALOALTO NETWORKS PRISMA® service. Database query #3 (illustrated as reference numeral 42c) specifies a third vendor's terminology. Indeed, because the distributed database service 28 may service hundreds, thousands, or even millions of different users and customers, the distributed database service 28 may receive millions of database queries 42 all specifying many different standards, formattings, and nomenclatures.

As FIG. 3 illustrates, the field aliasing 22 provides an elegant solution. The computer system 24 is programmed to perform the field aliasing 22 as a preprocessing step for each database query 42. The computer system 24 performs the field aliasing 22 to overcome the formatting and terminology differences between the database queries 42. FIG. 3 illustrates the computer system 24 as a rack server 50, which is commonly installed in server rooms and farms. The computer system 24, though, may be another processor-controlled device (as later paragraphs will explain). The server 50 stores and executes an operating system 52. The server 50 also stores a preprocessing software application 54 in a memory device 56. The server 50 has a hardware processor with cores 58 (illustrated as "CPU") that reads and executes the operating system 52 and the preprocessing software application 54. The preprocessing software application 54 has programming code or instructions that cause the server 50 to perform operations, such as reading the database query 42 and generating its aliased database query 60 using the field aliasing 22. The field aliasing 22 converts an entity-specific field name 62 to its corresponding alias field name 64. The field aliasing 22 is performed during the search time 46 and after receipt of the database query 42. Suppose, for example, that the query parameter 44 has a data field that specifies the entity-specific field name 62. The data field, in other words, uses or contains some term, label, title, or other columnar/row entry that is unique to a user/group/organization or other entity 66. Again, for example, suppose some of the query parameters 44 specify the entity-specific field name 62 according to the MICROSOFT AZURE MONITOR® service (as explained with reference to FIG. 2). Other query parameters 44, however, may specify the entity-specific field name 62 that is unique to the PALOALTO NETWORKS PRISMA® service (as also explained with reference to FIG. 2). Because the rack server 50 may receive many different database queries 42, and each database query 42 may use differing query terms that are unique to the service, service provider, or other entity 66. Whatever the vendor/service/supplier/customer/user/entity 66, the rack server 50 may perform the field aliasing 22 that maps, relates, or otherwise associates the entity-specific field name 62 to its corresponding alias field name 64.

Figure 4:
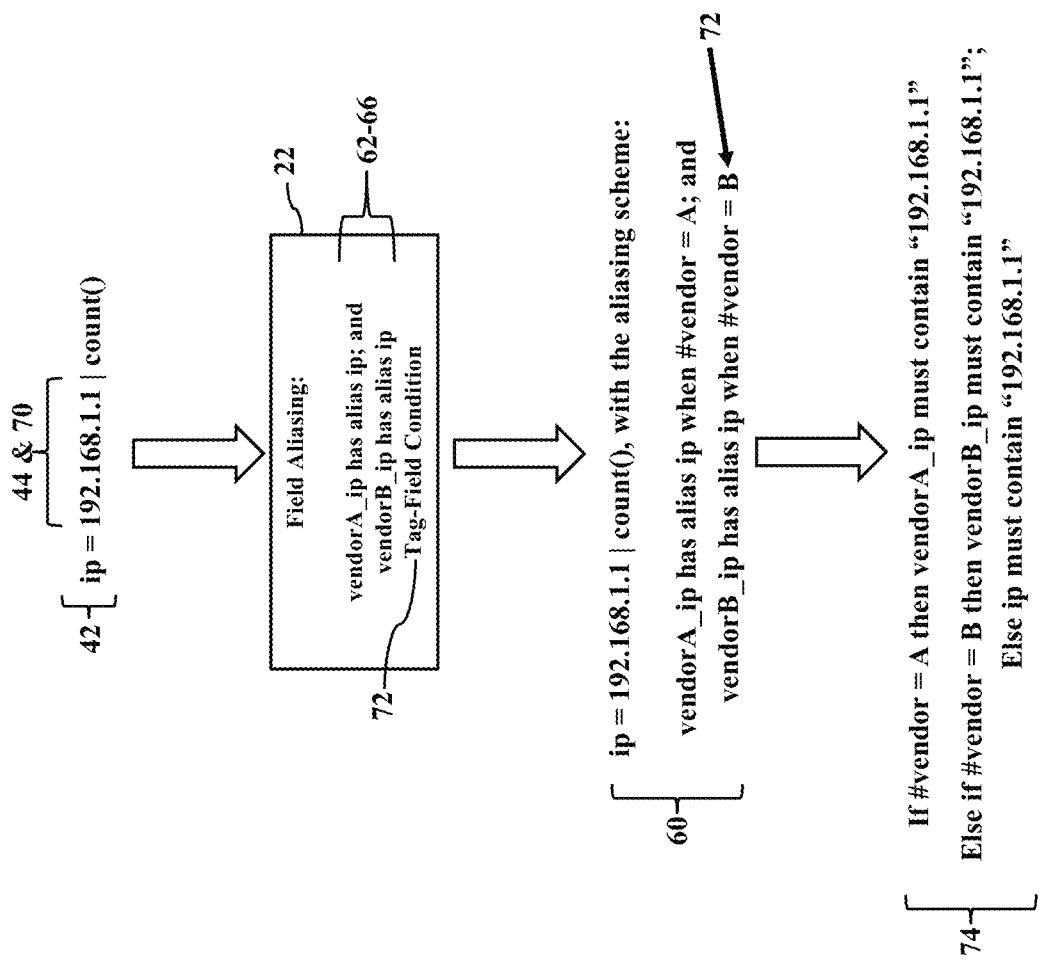
FIG. 4 illustrates some examples of the field aliasing.

FIG. 4 illustrates some examples of the field aliasing 22. The field aliasing 22 unifies the many different database queries 42. The field aliasing 22 replaces the entity-specific field name(s) 62 with their corresponding alias field name(s) 64. As FIG. 2 illustrates, suppose the database query 42 specifies the textual query parameter 44 as ip=192.168.1.1|count( ). This database query 42, for example, requests a numerical count of data records having an ip data field 70 (or alias of a field) containing the value "192.168.1.1" (e.g., the query parameter 44). Suppose also that the field aliasing 22 defines or specifies the aliasing scheme:

vendorA_ip has alias ip; and
vendorB_ip has alias ip.

Furthermore, suppose this identification was based on a tag-field condition 72 (e.g., #vendor=vendorA). Each entity-specific field name 62 may thus be replaced with its corresponding alias field name 64 and the tag-field condition 72. The tag-field condition 72 uniquely identifies the vendor/service/supplier/customer/user/entity 66. The field aliasing 22 may then translate the originally-submitted database query 42 during the search time 46 (illustrated in FIGS. 1-3). The originally-submitted database query 42 (specifying the query parameter 44 as ip=192.168.1.1|count( )) is converted to its aliased database query 60 as:

ip=192.168.1.1|count( ), with the aliasing scheme:
vendorA_ip has alias ip when #vendor=A; and
vendorB_ip has alias ip when #vendor=B.

The field aliasing 22 has thus translated the entity-specific field name 62 with its corresponding alias field name 64 using the tag-field condition 72. In simple words, the field aliasing 22 genericizes the vendor—and/or entity-specific field name 62 into its common alias field name 64.

The computer system 24 thus performs the field aliasing 22 to represent one or more logical conditional statements 74:

If #vendor=A then vendorA_ip must contain "192.168.1.1";
Else if #vendor=B then vendorB_ip must contain "192.168.1.1";
Else ip must contain "192.168.1.1".

The alias field name 64 may be a common marker or descriptor of the data field, regardless of the vendor/service/supplier or other entity 66. The alias field name 64, for example, may be a generic term, label, title, or other identifier that commonly or universally describes the data field containing or specifying the entity-specific field name 62. So, whatever the user/vendor/service/supplier/entity 66, the field aliasing 22 translates the entity-specific field name 62 into its corresponding alias field name 64. The field aliasing 22, for example, may change any query parameter 44, specified according to the MICROSOFT AZURE MONITOR® service, into its corresponding common or generic alias field name 64 using the unique tag-field condition 72. The field aliasing 22, as another example, changes any query parameter 44, specified according to the PALOALTO NETWORKS PRISMA® service, into its corresponding common or generic alias field name 64 using the tag-field condition 72. The field aliasing 22 translates the entity-specific field name 62 into its corresponding alias field name 64. So, whatever the vendor/service/supplier/customer/user/entity 66 and terminology, the field aliasing 22 re-expresses the entity-specific field name 62 using its corresponding alias field name 64 and the entity-specific tag-field condition 72.

Figure 5:
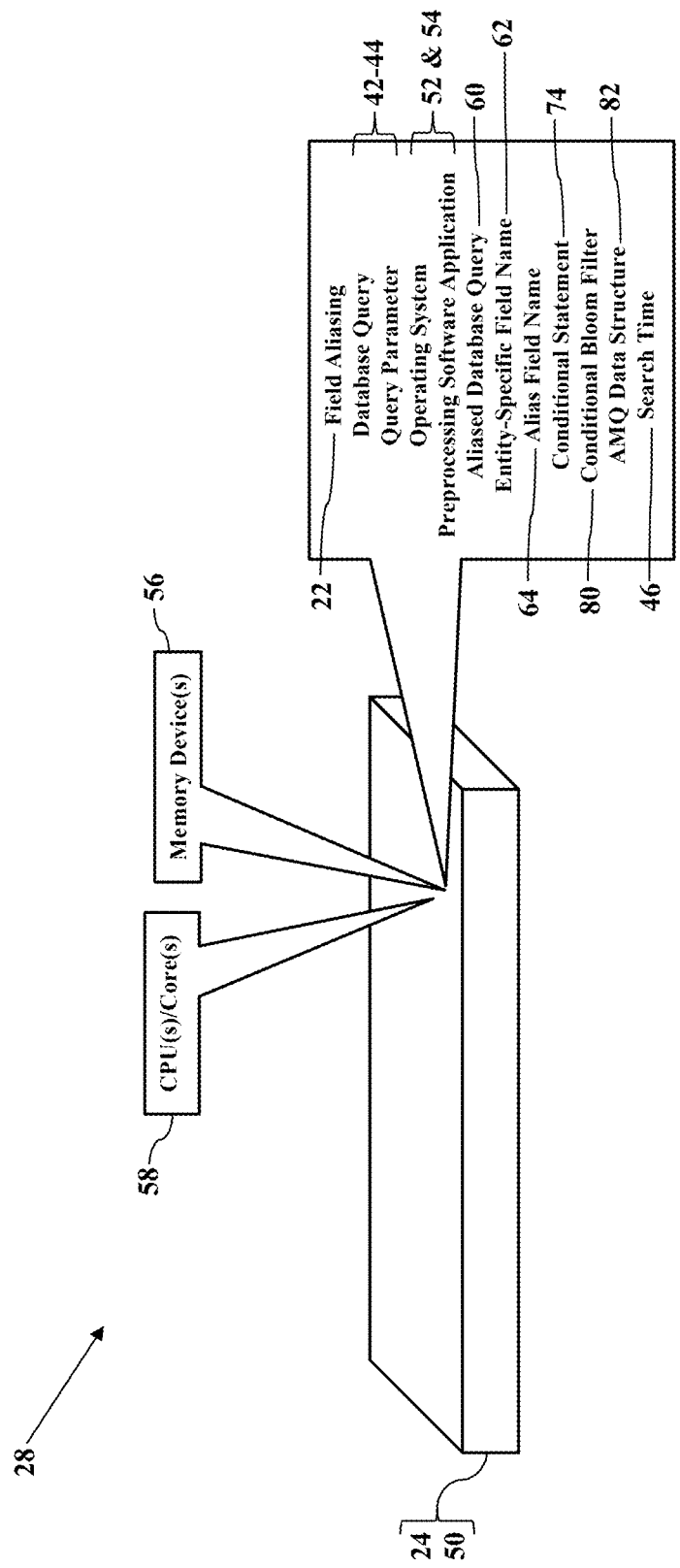
FIG. 5 illustrates some examples of a conditional Bloom filter.

FIG. 5 illustrates some examples of a conditional Bloom filter 80. The computer system 24 (again illustrated as the rack server 50) may generate the conditional Bloom filter 80 as another pre-processing procedure for each database query 42. That is, prior to executing the database query 42 on the distributed database 38, the distributed database service 28 may assign generation of the conditional Bloom filter 80 to the computer system 24 as another preprocessing step during the search time 46. After the computer system 24 performs the field aliasing 22 during the search time 46, for example, the preprocessing software application 54 instructs or causes the hardware processor/cores 58 to generate the conditional Bloom filter 80 using the aliased database query 60 and cryptographic hashing techniques (such as the SHA-256 hashing algorithm). That is, because the aliased database query 60 represents the conditional statement(s) 74, the conditional Bloom filter 80 also logically represents the conditional statement(s) 74. The conditional Bloom filter 80 is an example of a bit-setting approximate membership query (AMQ) data structure 82. The conditional Bloom filter 80 thus represents the conditional statement(s) 74 generated during the search time 46 using the field aliasing 22 that relates the entity-specific field name 62 to the corresponding alias field name 64.

Figure 6:
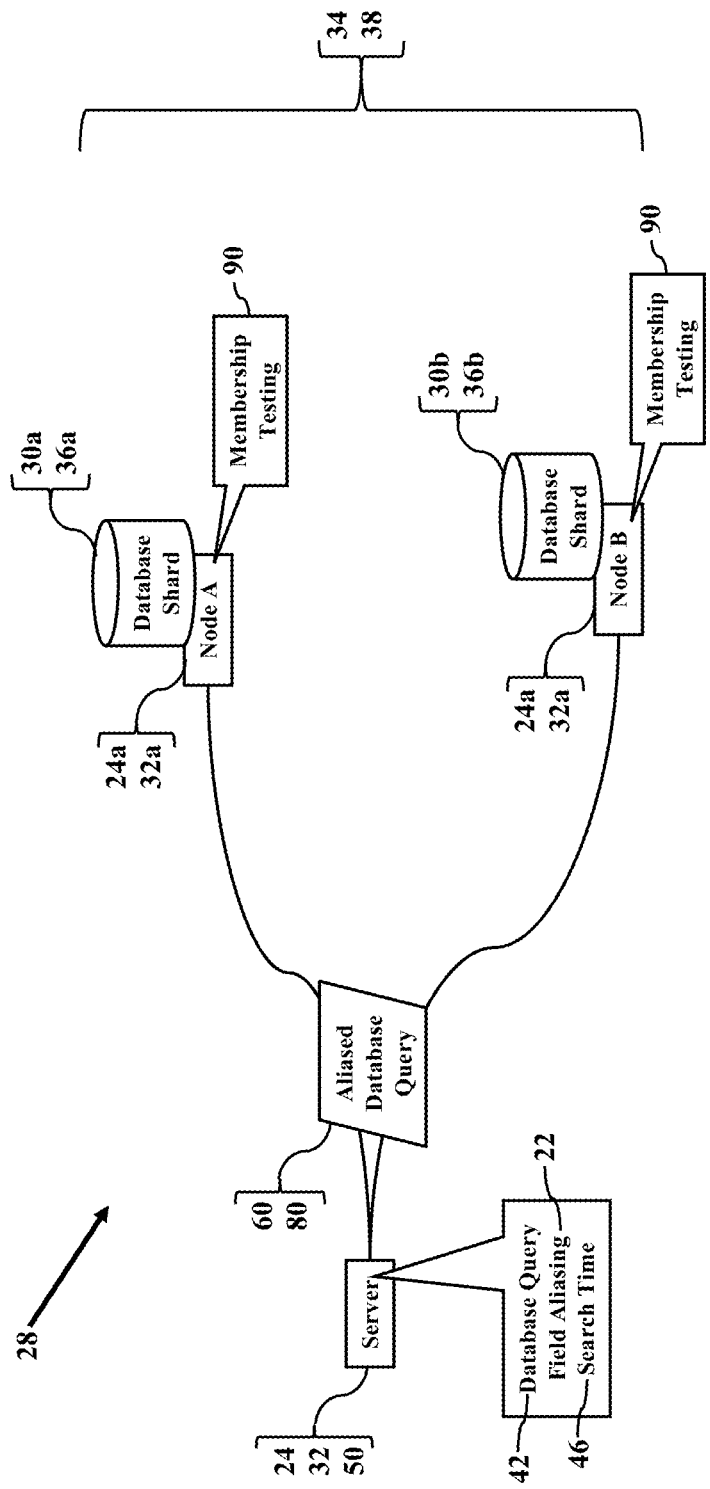
FIGS. 6-7 illustrate some examples of membership testing.
Figure 7:
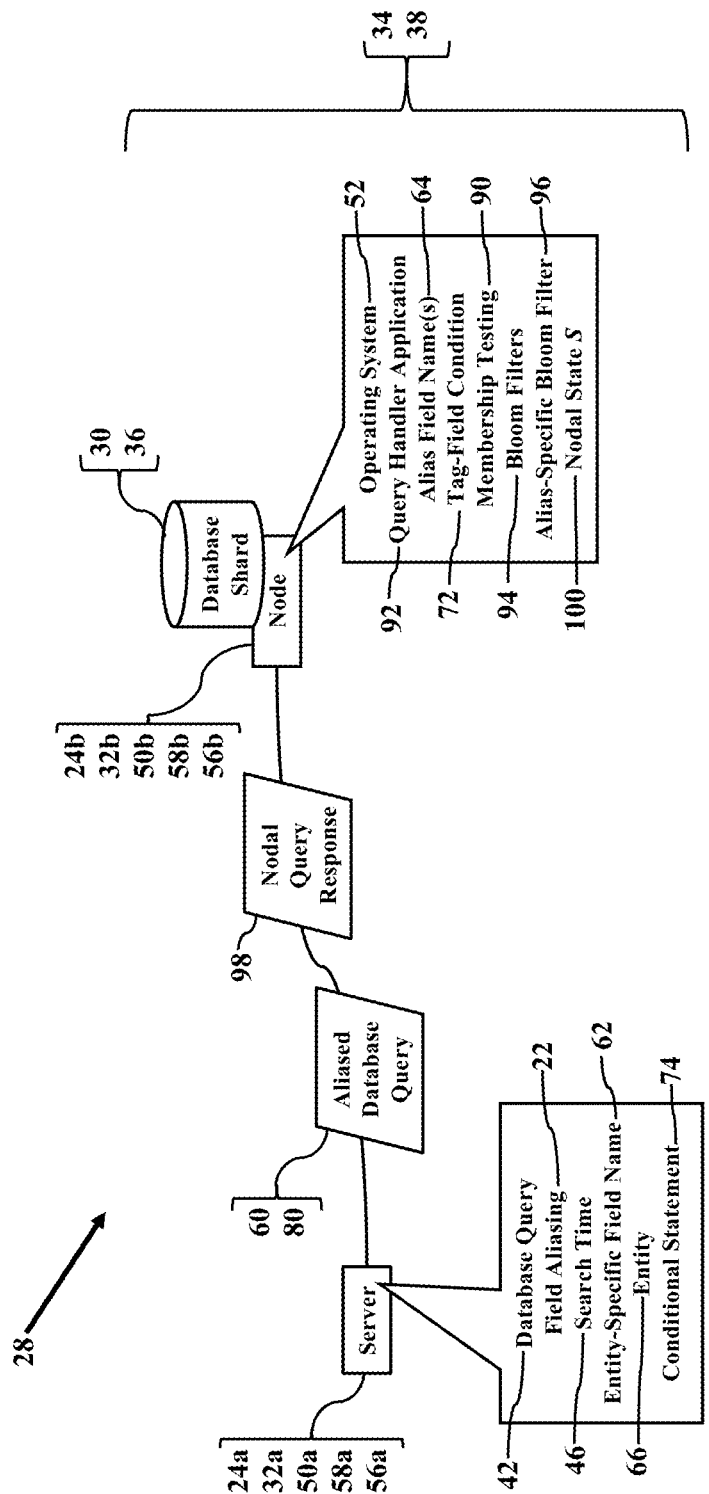

FIGS. 6-7 illustrate some examples of membership testing 90. Now that the computer system 24 (again illustrated as the rack server 50) has preprocessed the database query 42 during the search time 46 (as explained with reference to FIGS. 1-5), the distributed database service 28 may then proceed with querying the distributed database 38. As FIG. 6 illustrates, the rack server 50, as an example, may send the aliased database query 60 to each network address (e.g., IP address) associated with each computing node 32 storing or hosting its corresponding shard 36 of the distributed database 38. The rack server 50 may also send data representing the conditional Bloom filter 80 to each computing node 32. The conditional Bloom filter 80 may accompany the aliased database query 60 as data or an attachment, or the conditional Bloom filter 80 may be sent as a separate message. While FIG. 6 only illustrates a few computing nodes 32a-b, in an actual server room, though, there may be hundreds of the computing nodes 32. Each computing node 32 is thus instructed or caused to search its corresponding shard 36 according to the conditional Bloom filter 80 and/or the aliased database query 60.

As FIG. 7 illustrates, the computing node 32 may first or initially perform the membership testing 90. FIG. 7 illustrates the computing node 32 as another nodal rack server 50, but the computing node 32 may be another example of the computer system 24 or other processor-controlled device (as later paragraphs will explain). Because the computing node 32 is another example of the computer system 24, the computing node 32 has the hardware processor/cores 58 that execute the operating system 52 stored in the memory device 56. The hardware processor/cores 58 also executes/execute a query handler application 92 stored in the memory device 56. The query handler application 92 has programming code or instructions that cause the computing node 32 to perform operations, such as performing the membership testing 90 during the search time 46 using the conditional Bloom filter 80 that represents the conditional statement(s) 74 generated using the field aliasing 22. Conventional querying of the database shard 36 may require significant hardware (processor and memory) resources, electrical energy, and time. The query handler application 92, instead, may first cause the computing node 32 to execute the membership testing 90 of the database shard 36. The membership testing 90 requires less hardware resources, consumes less electrical power, and requires less time to complete. The computing node 32 may thus preliminarily test the conditional Bloom filter 80 during the search time 46. The computing node 32, for example, locally stores one or more Bloom filters 94 that represent its corresponding shard 36 of the distributed database 38. The computing node 32, for example, may locally store an alias-specific Bloom filter 96. The alias-specific Bloom filter 96 is an example of the Bloom filter 94 that represents the electronic content of the shard 36. The alias-specific Bloom filter 96, though, may be expressed and/or generated using the common, universal, or generic alias field name(s) 64. Some or all of the alias field name(s) 64 may be tagged using the vendor/entity-specific tag-field condition 72. The alias-specific Bloom filter 96, in other words, may represent the genericized versions of the electronic data 30, regardless of the vendor/service/supplier/customer/user/entity 66 and their entity-specific field name(s) 62.

The membership testing 90 is quick and efficient. The computing node 32 may membership test the conditional Bloom filter 80 to the alias-specific Bloom filter(s) 96 that represent the corresponding portion or shard 36 of the distributed database 38. If the membership testing 90 is negative/0/no/none, then the conditional Bloom filter 80 is not a member of the alias-specific Bloom filter(s) 96 that represent the nodal shard 36 of the distributed database 38. Because the conditional Bloom filter 80 fails the membership testing 90, the conditional statement(s) 74 is/are logically false and there is no reason to intensively search the nodal shard 36. Simply put, when the membership testing 90 is negative/0/no/none, then the nodal shard 36 does not contain, nor match, the database query 42. The computing node 32 generates its nodal query response 98, based on the membership testing 90 of the conditional Bloom filter 80. The nodal query response 98, for example, may indicate that the membership testing 90 is negative/0/no/none. The nodal query response 98, as another example, may indicate that a nodal query state S (indicated as reference numeral 100) associated with the database shard 36 is null/empty/none. The computing node 32 sends the nodal query response 98 to the network address (e.g., IP address) to some service destination that collects all nodal results. For simplicity, though, FIG. 7 illustrates nodal query response 98 routing back to the query originator (such as the rack server 50a).

Figure 8:
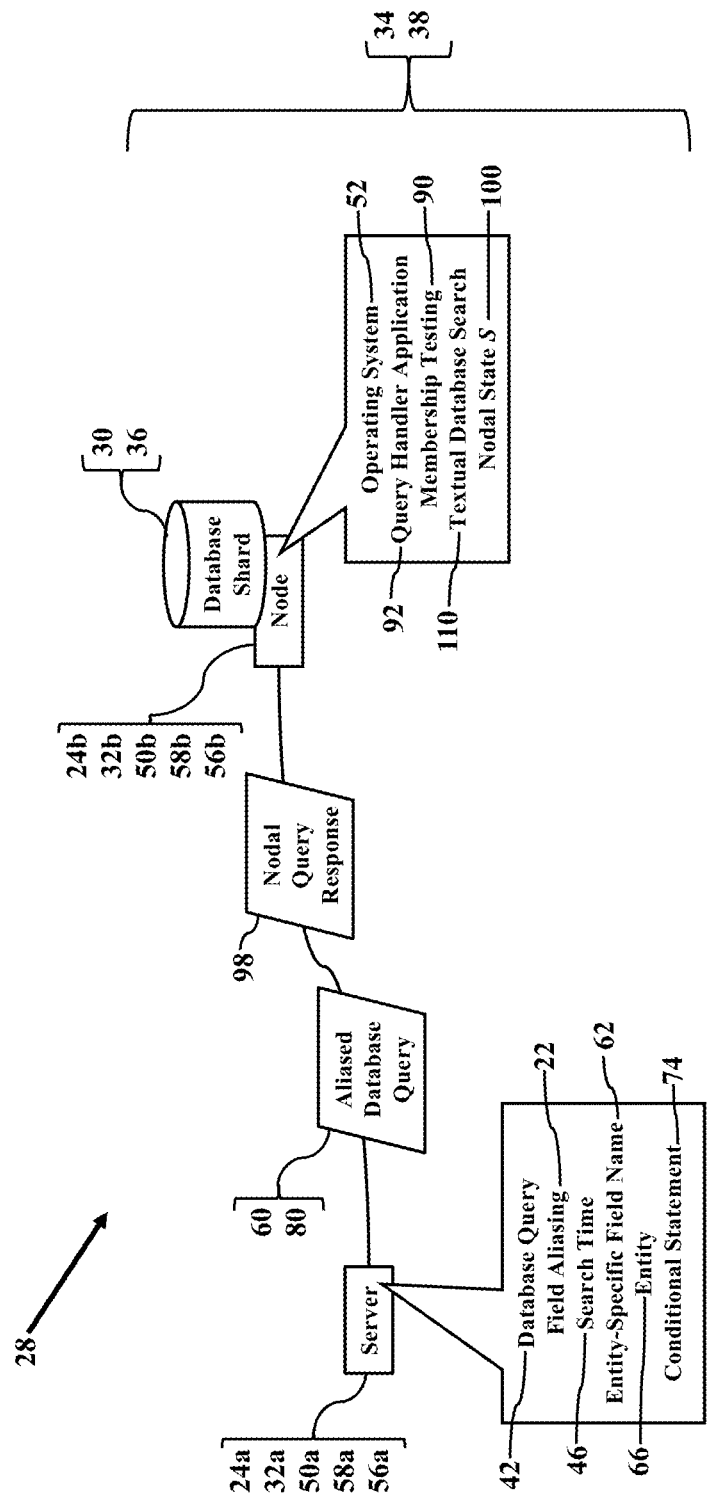
FIG. 8 illustrates intensive database searching.

FIG. 8 illustrates hardware intensive database searching. The computing node 32 may initially membership test the conditional Bloom filter 80 to the alias-specific Bloom filter(s) 96 that represent the corresponding portion or shard 36 of the distributed database 38 (as explained with reference to FIG. 7). If the membership testing 90 is negative/0/no/none, then the computing node 32 determines that the nodal shard 36 does not contain, nor match, the database query 42. If, however, the membership testing 90 is positive/1/yes, then the computing node 32 determines that the conditional Bloom filter 80 may be a member of the alias-specific Bloom filter(s) 96 that represents the nodal shard 36 of the distributed database 38. The query handler application 92 may thus subsequently cause or instruct the computing node 32 to execute a more resource-intensive textual database search 110. That is, because the membership testing 90 is positive/1/yes, the shard 36 may, or may not, contain the database query 42. The computing node 32 should perform the textual database search 110, in response to the positive membership. The query handler application 92 may instruct the computing node 32 to send a preliminary version of the nodal query response 98 indicating that the membership testing 90 is positive/1/yes, so the more-intensive and time-consuming textual database search 110 is also being executed during the search time 46. Regardless, when the computing node 32 completes the textual database search 110 (perhaps still during the search time 46), the computing node 32 reports its final version of the nodal query response 98. The computing node 32 sends the nodal query response 98 to the network address (e.g., IP address) to some service destination that collects all nodal results. Again, though, for simplicity FIG. 8 illustrates nodal query response 98 routing back to the query originator (such as the rack server 50a).

The field aliasing 22, and the conditional Bloom filter 80, present elegant solutions. Many cloud services 20 interface with many different vendors/services/suppliers/users/customers and other entities 66. These many different entities 66, with their differing data schemes, can make the electronic data 30 difficult to correlate. These many different entities 66 also make the database queries 42 difficult to efficiently search. Each entity's electronic data 30 may have the same meaning, even though produced under different schemas. The field aliasing 22, though, normalizes the database query 42 at the search time 46 as a preprocessing step. The field aliasing 22 thus normalizes each vendor's unique, entity-specific field name 62 into its corresponding alias field name 64. The field aliasing 22 may further normalize a set of the entity-specific field names 62 into its corresponding set of the common, alias field names 64. The field aliasing 22 and the conditional Bloom filter 80 thus provide elegant solutions to enable search-time field aliasing with minimal performance overhead. The field aliasing 22 implements a scheme that relates each entity's specific field names 62 to a corresponding set of common alias field names 64.

Conventional renaming schemes are slow, wasteful, and produce a frustrating user experience. Conventional schemes rename each vendor's data. That is, conventional schemes rename the original vendor- or entity-specific name terms to their corresponding aliases. These conventional renaming schemes, though, require significant hardware resources, time, and electrical energy. Suppose, for example, that there are fifty (50) common aliases, and each vendor has fifty (50) vendor-specific fields that are mapped to these aliases. Suppose also that there are ten (10) vendors. The conventional renaming schemes results in (50×10=500) required rename( ) statements. Performing these 500 rename( ) statements, per event at the search time 46, would bog down hardware resources, thus requiring longer search times and more electrical power. Longer search times also create an unsatisfactory user query experience.

The field aliasing 22, though, greatly improves computer functioning. The field aliasing 22, performed at the search time 46, is much simpler and faster. The field aliasing 22 recognizes that when processing/storing/logging any electronic data 30 (such as event(=log)), the electronic data 30 originates from, at most, one unique vendor/service/supplier/customer/user or other entity 66 combination (e.g., user/group/company). The field aliasing 22, in other words, need only perform, at most, fifty (50) renames per event, as vendor-specific fields from all other vendors need not be aliased on the same event. The field aliasing 22 thus implements unique identifiers (such as the tag-field condition 72) for each entity 66, thus reducing the maximal number of renames from 500 to 50. Furthermore, using the tag-field condition 72 (e.g., #vendor=vendorA), then the field aliasing 22 may map or convert the entity-specific field names 62 into their corresponding set of the common, alias field names 64. The field aliasing 22 thus significantly reduces performance overhead of supporting field aliases at the search time 46. The field aliasing 22 consumes less memory space, is much faster and simpler to accomplish at the search time 46, and requires an order of magnitude less renames and data reads. Memory allocation is reduced, processor cycles are reduced, input/output operations are reduced, and translations from kernel space to user space are reduced. The field aliasing 22 greatly improves computer functioning.

The conditional Bloom filter 80 also greatly improves computer functioning. The conditional Bloom filter 80 allows the distributed database service 28 to preliminarily conduct the membership testing 90 during the search time 46. The membership testing 90 is a quick and economical check of the conditional Bloom filter 80 to the Bloom filters 94 (such as the alias-specific Bloom filter(s) 96) representing the distributed database(s) 38. After the distributed database service 28 receives the database query 42, the distributed database service 28 generates the aliased database query 60 during the search time 46 using the field aliasing 22. The distributed database service 28 instructs a query compiler (such as the computer system 24) to extract the conditional Bloom filter 80 representing the conditional statement 74 generated using the field aliasing 22. The distributed database service 28 then instructs a query engine (such as the computer system 24 or the computing node 32) to conduct the membership testing 90 that matches the conditional Bloom filter 80 against the Bloom filters 94 (such as the alias-specific Bloom filter(s) 96) representing the distributed database(s) 38. The membership testing 90 thus allows the query engine to skip reading/processing/searching the vast majority of the electronic data 30 stored in the distributed database 38. The conditional Bloom filter 80 thus greatly improves computer functioning by reducing hardware and memory operations, reducing electrical power consumption, and reducing the search time 46.

The improved computer functioning has been experimentally verified. The database query 42 of "ip=192.168.1.1|count (#vendor)" requests a numerical count of cybersecurity events or other database records that have the "#vendor" tag-field, and where the "ip" field contains the value 192.168.1.1. The distributed database service 28 used the field aliasing 22 and generated the conditional Bloom filter 80 representing the conditional statements 74 asserting that the (potentially aliased) field "ip" and tag field "#vendor" must exist and the (potentially aliased) "ip" field should contain the text "192.168.1.1". At the search time 46, this conditional Bloom filter 80 is membership tested to the Bloom filters 94 (such as the alias-specific Bloom filter(s) 96) representing the distributed database(s) 38. The membership testing 90 reveals whether or not (e.g., maybe or definitely no) the distributed database 38 (such as the nodal shard 36) contains the electronic data 30 satisfying the conditional statements 74. If the membership testing 90 is null/no/negative, then the query engine (such as the computing node 32 storing the shard 36) may skip or decline and a search of the entire shard 36. By associating each vendor-specific set of aliases with the tag-condition 72, the distributed database service 28 implements the below conditional statements 74:

vendorA_ip has alias ip when #vendor=A; and
vendorB_ip has alias ip when #vendor=B.

The distributed database service 28 thus generates the conditional Bloom filter 80 representing the conditional statements 74:

If #vendor=A then vendorA_ip must contain "192.168.1.1";
Else if #vendor=B then vendorB_ip must contain "192.168.1.1";
Else ip must contain "192.168.1.1"

At the search time 46, then, the distributed database service 28 uniquely detects which vendor-specific set of aliases to use and thus reverse-maps the alias field name 64 to its originating entity-specific field name 62. Also during the search time 46, the distributed database service 28 may at least partially evaluate the conditional Bloom filter 80 with respect to the known set of tags, thus retaining the preciseness of Bloom filtering, and in turn retaining the performance benefit of Bloom filters in the presence of aliases. Experiments show that using these techniques reduces performance overhead by up to seven (7) times compared to using conventional renaming approaches.

Figure 9:
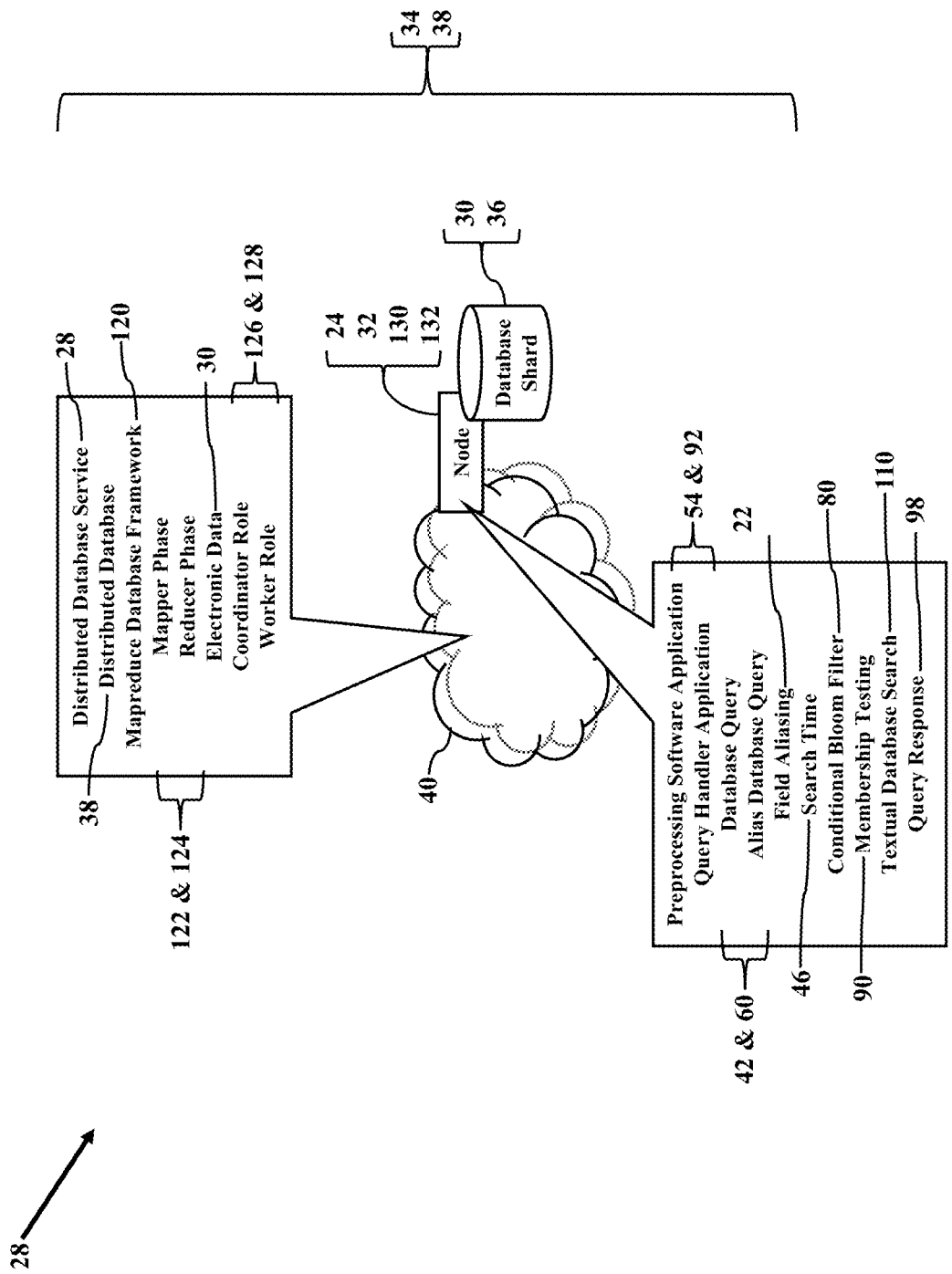
FIGS. 9-10 illustrate examples of field aliasing and conditional Bloom filtering implemented in a mapreduce database framework.
Figure 10:
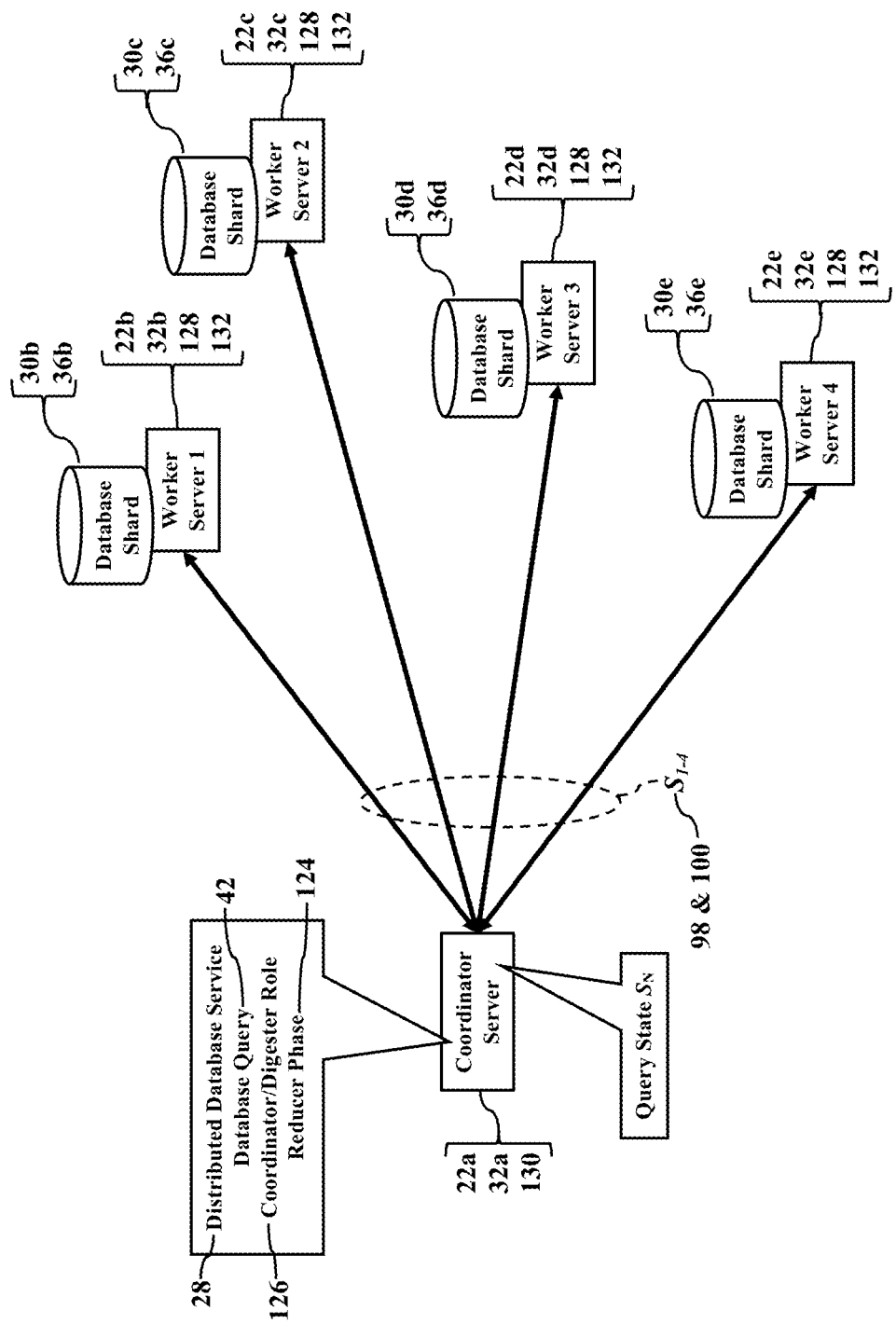

FIGS. 9-10 illustrate examples of the field aliasing 22 and the conditional Bloom filter 80 implemented in a mapreduce database framework 120. The cloud-based distributed database service 28 may implement the mapreduce database framework 120 to store and to retrieve large datasets of the electronic data 30. The mapreduce database framework 120 may also implement the field aliasing 22 and the conditional Bloom filter 80 to quickly and more efficiently generate search results responsive to the database queries 42. The computing cluster 34 provides the distributed database service 28, and the computing cluster 34 uses the mapreduce database framework 120 to generate the nodal query results 98 in response to each database query 42. The mapreduce database framework 120 uses mapping functions and reducing functions (hence the term mapreduce) to generate search results in large datasets. A mapper phase 122, for example, may be highly distributive and processes terabytes (TB) of the electronic data 30. A reducer phase 124, though, may be centralized and process/merge much smaller datasets to produce the final/reduced query result 98. The mapreduce database framework 120 may have even more phases that further query and/or process datasets. The mapreduce database framework 120 is generally used by many big data cloud services (such as AMAZON®, MICROSOFT®, IBM®, and CROWDSTRIKE®), so the mapreduce database framework 120 need not be explained in detail. The computer node 32 may implement the field aliasing 22 and the conditional Bloom filter 80 to quickly and efficiently search its shard 36.

The cloud-based distributed database service 28 may further include role play. The cloud-based distributed database service 28 may implement roles or responsibilities. The cloud-based distributed database service 28, for example, may assign a coordinator role 126 and/or a worker role 128. The coordinator role 126, for example, may manage or administer the distributed database service 28 and/or the database query 42 (such as the field aliasing 22 and the conditional Bloom filter 80). The worker role 128, for example, may perform data storage/retrieval work (such as the membership testing 90 and the textual database search 110). One or more of the computer systems/nodes 24/32 may have the coordinator role 126, and one or more of the computer systems/nodes 24/32 may have the worker role 128. Indeed, the computer systems/nodes 24/32 may dynamically switch from, between, and/or to the coordinator role 126 and the worker role 128. Each computer system/node 24/32 may thus locally store and execute the preprocessing software application 54 and the query handler application 92, thus again allowing each computer system/node 24/32 to function or perform according to the coordinator role 126 and/or to the worker role 128. The computer systems/nodes 24/32 may thus be indicated as a coordinator server 130 or as a worker server 132, depending on the dynamically-assigned coordinator role 126 or the worker role 128.

The computer system 24 (such as the computing node 32) improves functioning by using the conditional Bloom filter 80. The computer systems/nodes 24b/32b, for example, may receive the aliased database query 60 specifying the conditional Bloom filter 80 representing the query parameter 44. That is, a computing member (such as the coordinator server 130 performing the coordinator role 126, for example) may generate the conditional Bloom filter 80 to represent the conditional statement(s) 74 using the field aliasing 22 that relates the entity-specific field name(s) 60 to the corresponding alias field name(s) 62 (as explained with reference to FIGS. 1-5). The computing member (again perhaps the coordinator server 130 performing the coordinator role 126) may then distribute the conditional Bloom filter 80 to the worker server(s) 132 performing the worker role 128. However the aliased database query 60 is received, the aliased database query 60 requests a preliminary search (e.g., the membership testing 90) of the shards 36 according to the conditional Bloom filter 80. Each worker server 132 then compares the conditional Bloom filter 80 to its local database shard 36. Each worker server 132 performs the preliminary membership testing 90 of the binary bits representing the conditional Bloom filter 80 (such as during the mapper phase 122) associated with the mapreduce database framework 120 to the Bloom filters (such as the alias-specific Bloom filter 96) representing its local database shard 36. Each worker server 132 generates thus its corresponding nodal query response/state 98/100 that represents membership testing 90 of the conditional Bloom filter 80. The preliminary membership testing 90 allows the query engine (e.g., the worker server 132) to skip reading/processing/searching the vast majority of the electronic data 30 stored in its local database shard 36. The conditional Bloom filter 80 thus allows the computer system 24 to greatly improve computer functioning by reducing hardware and memory operations, by reducing electrical power consumption, and by reducing the search time 46.

The distributed database service 28 is only simply described. The distributed database service 28 distributes the portions or shards 36 of the distributed database 38 among the computer nodes 32. In an actual data center or server farm, for example, the distributed database service 28 may have many different clusters 34, and each cluster 34 may have many (perhaps even hundreds or thousands) of the computer nodes 32 providing the distributed database service 28. Such a large computer cluster 34, though, is too confusing and too difficult to illustrate. FIG. 10, for simplicity then, only illustrate a simple example in which the cluster 34 has five (5) computer systems 22a-c as computer nodes 32a-c. Each computer node 32 may thus store its corresponding database shard 36. Each computer system/node 24/32 is associated with the cluster 34, but the computer systems 24 may have other geographical or logical grouping or organization (such as the aforementioned data center or even a single computer machine).

Figure 11:
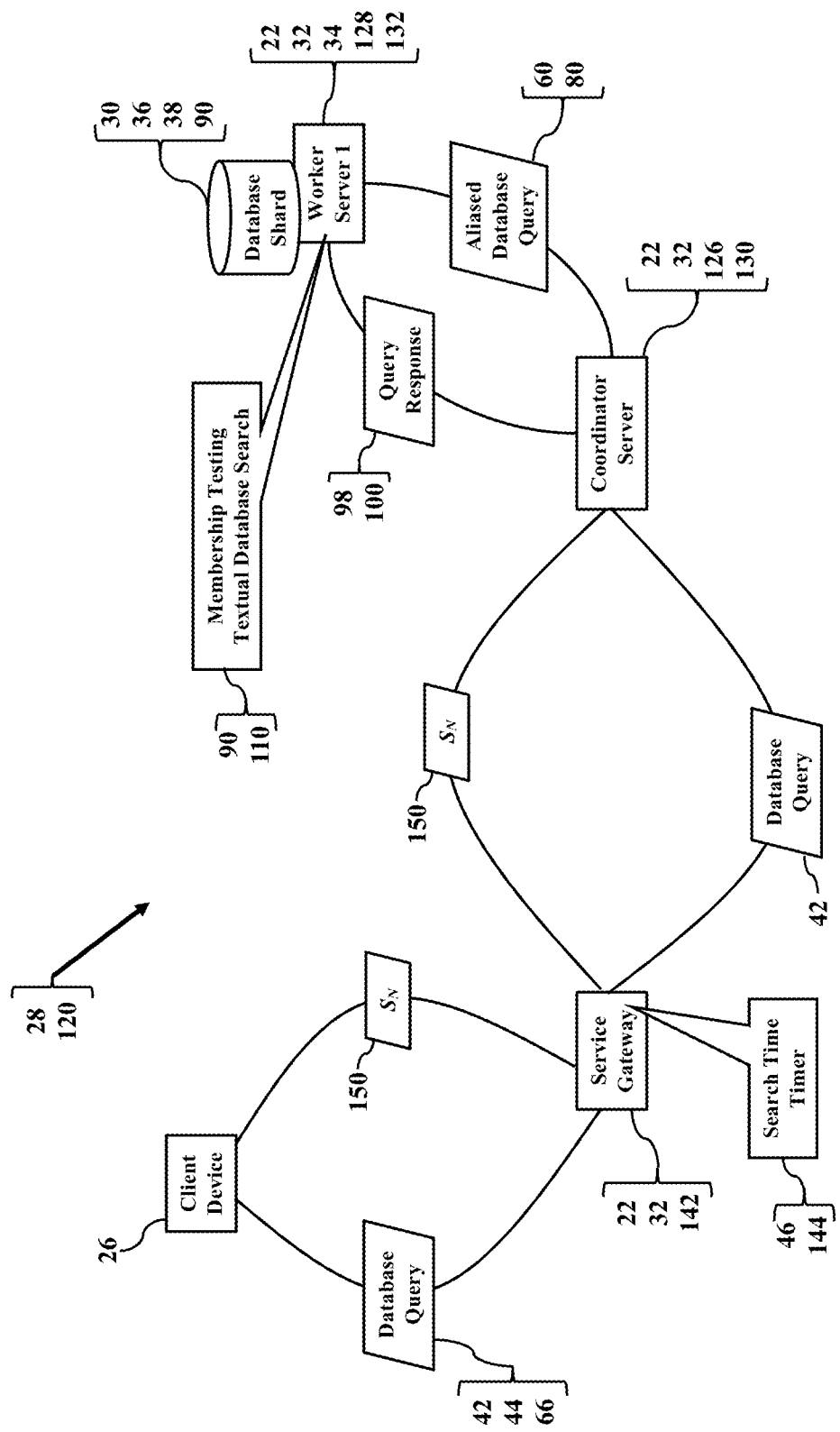
FIG. 11 illustrates a more detailed architectural example of the mapreduce database framework.

FIG. 11 illustrates a more detailed architectural example of the mapreduce database framework 120. The mapreduce database framework 120 receives the database query 42 via a communications network (not shown for simplicity) from the client device 26. The database query 42, for example, is received by a service gateway 142 or other computer system/node 22/32 affiliated with the distributed database service 38 and/or with the mapreduce database framework 120. The database query 42 requests a search of the distributed database 38 according to the query parameter 44 (as explained with reference to FIGS. 1-5). The database query 42 is associated with a vendor, service, supplier, customer, user, or other entity 66 (such as via an IP address, MAC address, or other unique user/machine identifier associated with the client device 26). A time-stamped receipt of the database query 42 (such as by the service gateway 142 or other computer system/node 22/32) may start the search time 46 for processing and answering the database query 42. As a simple example, at receipt of the database query 42 by a nodal component of the distributed database service 38 and/or the mapreduce database framework 120, the distributed database service 38 may initialize a timer 144 at an initial value (such as zero) and commence incrementing the timer 144. Whatever the database query 42 (such as via a text input, user interface input, or API specification), the nodal members pass the database query 42 to the coordinator server 130 managing searches associated with the computing cluster 34. The coordinator server 130, performing the coordinator role 126, may act as a query handler and pre-process the database query 42 (such as executing the field aliasing 22 and generating the conditional Bloom filter 80, as explained with reference to FIGS. 1-5). The coordinator server 130 may then distribute the conditional Bloom filter 80 to the worker server 128 storing the respective database shard 36. The worker server 132 first performs the preliminary membership testing 90 using the conditional Bloom filter 80 (as explained with reference to FIGS. 6-7). Each worker server 132 tests the conditional Bloom filter 80 to the Bloom filters (such as the alias-specific Bloom filter 96) representing its local database shard 36. If the membership testing 90 is negative/0/no/none, then the query parameter 44 is definitively not found in the database shard 36. The worker server 132 may quickly respond indicating no search results (again as explained with reference to FIGS. 6-7).

Positive testing requires more search time 46. If, however, the membership testing 90 is positive/1/yes, then the worker server 132 must execute the more resource-intensive textual database search 110 of the database shard 36 (as explained with reference to FIGS. 7-8). The worker server 132 searches its local database shard 36 according to the textual query parameter 44 specified by the database query 42. The worker server 132 generates and sends its query result 98 (such as its corresponding nodal query state S, 100) back to the coordinator server 130. The coordinator server 130 assembles, sums, formats, and/or aggregates all the N individual nodal query results/states 98/100 to produce an overall or total query state SN (illustrated as reference numeral 150). The mapreduce database framework 120 may then send the overall or total query state SN back to the client device 26. The time-stamped sending of the overall or total query state SN may thus indicate an end of the search time 46. The mapreduce database framework 120 may thus terminate or stop the timer 144 at a final value representing the time-stamped sending of the overall or total query state SN.

The conditional Bloom filter 80 may have a structure, formatting, and storage location. The conditional Bloom filter 80 represents the query parameter 44 post-field aliasing 22. The conditional Bloom filter 80 may be stored as a data blob in the local memory device 56 (such as a database entry or in cache memory). The conditional Bloom filter 80 may also be stored as a series of bytes in the memory device 56. The conditional Bloom filter 80 may also be represented as a file on disk, a file over the network, the data blob, or the series of bytes.

The field aliasing 22 and the conditional Bloom filter 80 may be implemented regardless of the operating system 52. Familiar examples of the operating system 52 include a version of MICROSOFT WINDOWS®, APPLE MACOS® and IOS®, GOOGLE ANDROID®, UNIX®, and LINUX®. Indeed, the field aliasing 22 and the conditional Bloom filter 80 may be adapted to other operating systems.

Figure 12:
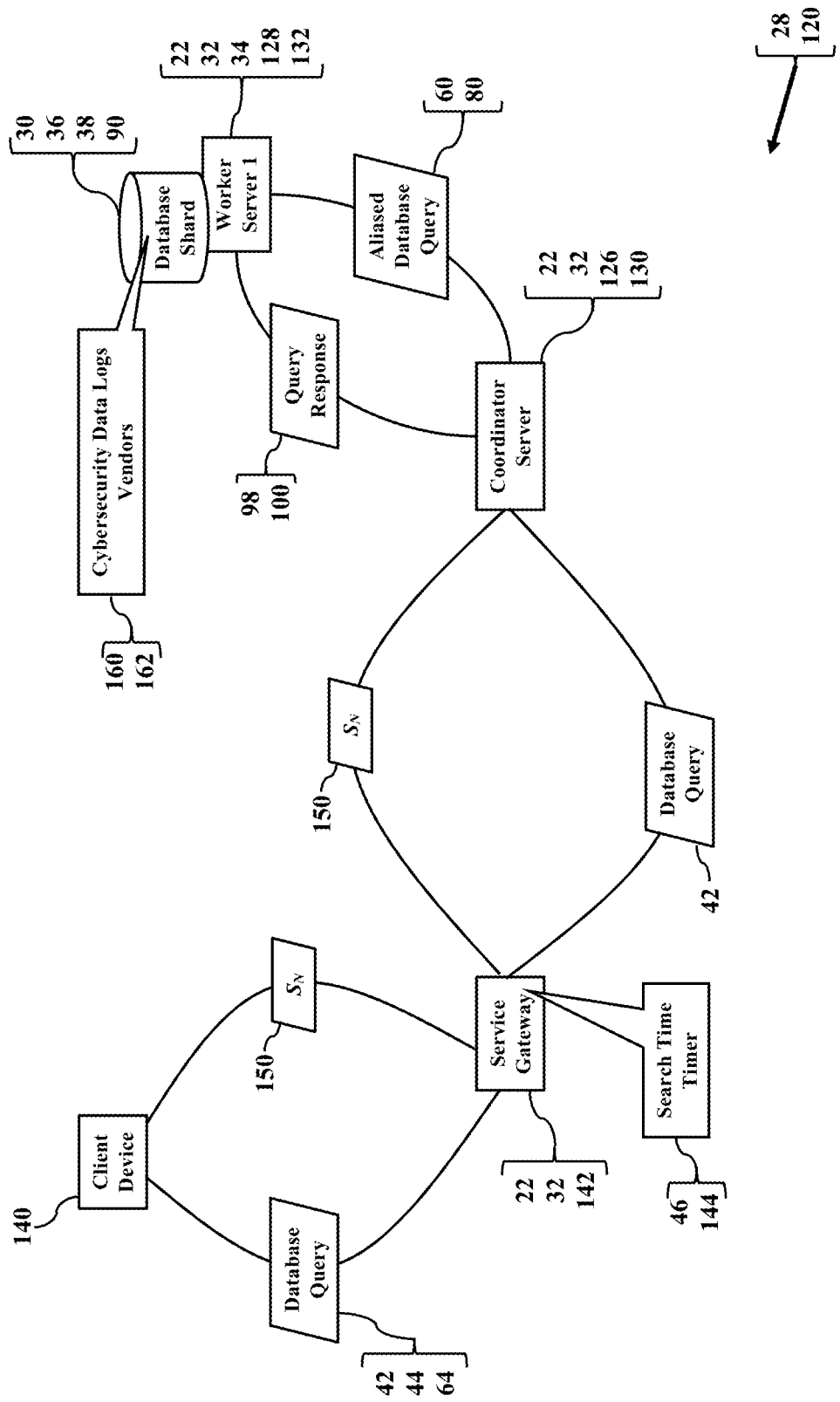
FIG. 12 illustrates examples of cybersecurity logging.

FIG. 12 illustrates examples of cybersecurity logging. The distributed database service 28 may collect, distribute, and store the electronic data 30 representing cybersecurity data logs 160. As computers are used, the computers and communications networks generate much electronic data 30. The electronic data 30, in particular, may be the cybersecurity data logs 160 describing usage. The cybersecurity data logs 160 are analyzed to reveal cybersecurity threats. The computers and networks may thus forward the cybersecurity data logs 160 to the distributed database service 28. The distributed database service 28 archives the cybersecurity data logs 160 for safe-keeping and for analysis. The distributed database service 28 may thus ingest petabytes of the cybersecurity data logs 160 generated by many different users, customers, companies, and devices. These varied cybersecurity data logs 160 often have many different data logging formats, schemes, and other entities 66 (such as vendors 162). The distributed database service 28 may thus implement the field aliasing 22 that standardizes the many different cybersecurity data logs 160 associated with the data logging vendors 162. The distributed database service 28, in other words, executes the field aliasing 22 to transform cybersecurity operating system events (specifying the entity-specific field names 62) into unified or standardized cybersecurity events (specifying the common alias field names 64), regardless of the entity/vendor 66/162 associated with the cybersecurity data logs 160. Moreover, because the distributed database service 28 may periodically ingest petabytes of the cybersecurity data logs 160, the distributed database service 28 may implement the mapreduce database framework 120 and the membership testing 90 to greatly reduce the search time 46 associated with the database queries 42. The mapreduce database framework 120 may thus interface with many different computer data logging vendors 162, data logging shippers, and other cybersecurity logging entities 66. The mapreduce database framework 120 ingests and distributes the cybersecurity data logs 160 for storage among the worker servers 128. Each worker server 128 thus stores some portion of the cybersecurity data logs 160 to its local database shard 36.

Clients may thus query for the cybersecurity data logs 160 of interest. The cybersecurity data logs 160 are of great interest to IT and cybersecurity professionals. Clients of the distributed database service 28 often analyze the cybersecurity data logs 160 for current and historical threat investigations. An IT/cybersecurity professional may thus issue the database query 42 using the client device 26. The database query 42 routes via communications networks to the network/IP address associated with the distributed database service 28. When the distributed database service 28 receives the database query 42, the distributed database service 28 initiates the search time 46 and routes the database query 42 to the coordinator server 130 managing searches associated with the distributed database 38 and/or the computing cluster 34. The coordinator server 130, performing the coordinator role 126, pre-processes the database query 42 by performing the field aliasing 22 and by generating the conditional Bloom filter 80. The coordinator server 130 then sends queries (such as the aliased database query 60) to the worker servers 128 storing their respective database shards 36. The coordinator server 130, though, may first instruct the worker servers 128 to execute the membership testing 90 using the conditional Bloom filter 80. Each worker server 132 thus performs the preliminary membership testing 90 (such as during the mapper phase 122). Each worker server 132 tests the conditional Bloom filter 80 to the Bloom filters (such as the alias-specific Bloom filter 96) representing its local database shard 36. If the membership testing 90 is negative/0/no/none, then the worker server 132 may quickly respond with an indication of no search result and/or no/null nodal query state S. If, however, the membership testing 90 is positive/1/yes, then the worker server 132 may inform the coordinator server 130 that the membership testing 90 was positive/1/yes/inconclusive. The worker server 132 thus needs more search time 46 to execute the longer textual search of the database shard 36. The worker server 132 searches its local database shard 36 according to the textual query parameter 44 specified by the database query 42. The worker server 132 generates and sends its query result/state 98/100 back to the coordinator server 130. The coordinator server 130 assembles, formats, and/or aggregates all the individual nodal query response/state 98/100 to produce the overall query result (such as the total query state SN 150). The distributed database service 28 may then send the overall or total query state SN back to the client device 26 and end/terminate the search time 46.

Figure 13:
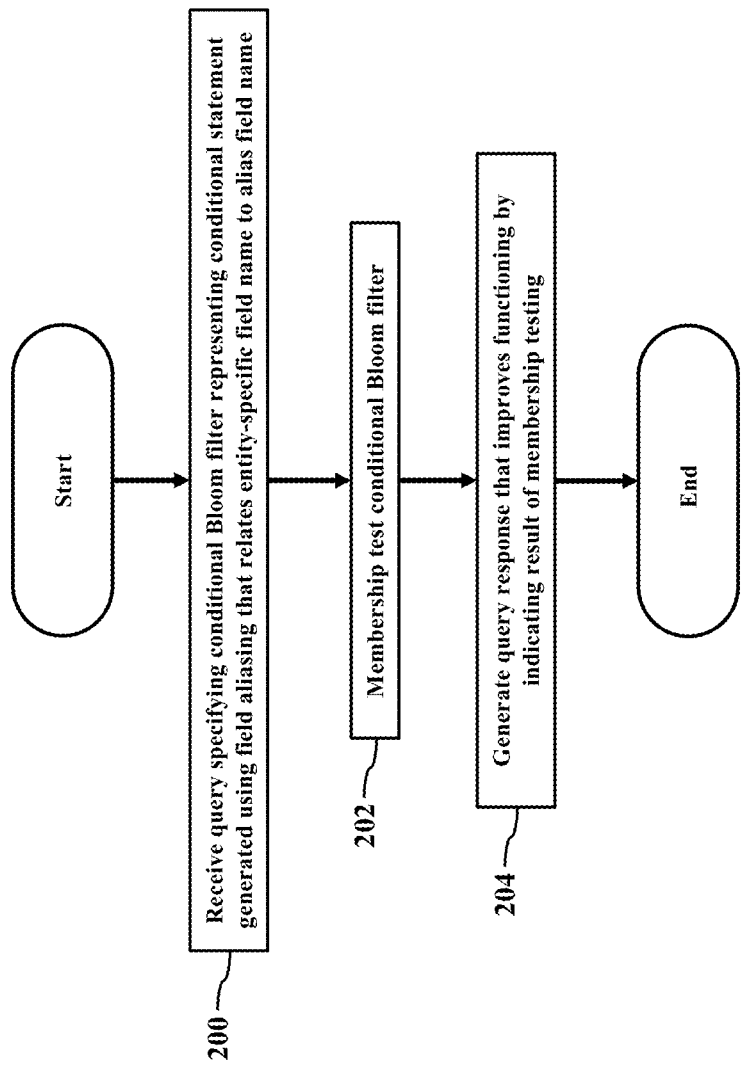
FIGS. 13-15 illustrate examples of different method or operations that improve computer functioning by using field aliasing and conditional Bloom filtering.

FIG. 13 illustrates examples of a method or operations executed by the computer system 24 that improves functioning by using the conditional Bloom filter 80. The computer system 24 receives a query (such as the aliased database query 60) specifying the conditional Bloom filter 80 representing the conditional statement 74 generated using the field aliasing 22 that relates the entity-specific field name 62 to the corresponding alias field name 64 (Block 200). The computer system 24 membership tests the conditional Bloom filter 80 (Block 202) and generates the query response 98 that improves the functioning by indicating a result of the membership testing 90 of the conditional Bloom filter 80 (Block 204).

Figure 14:
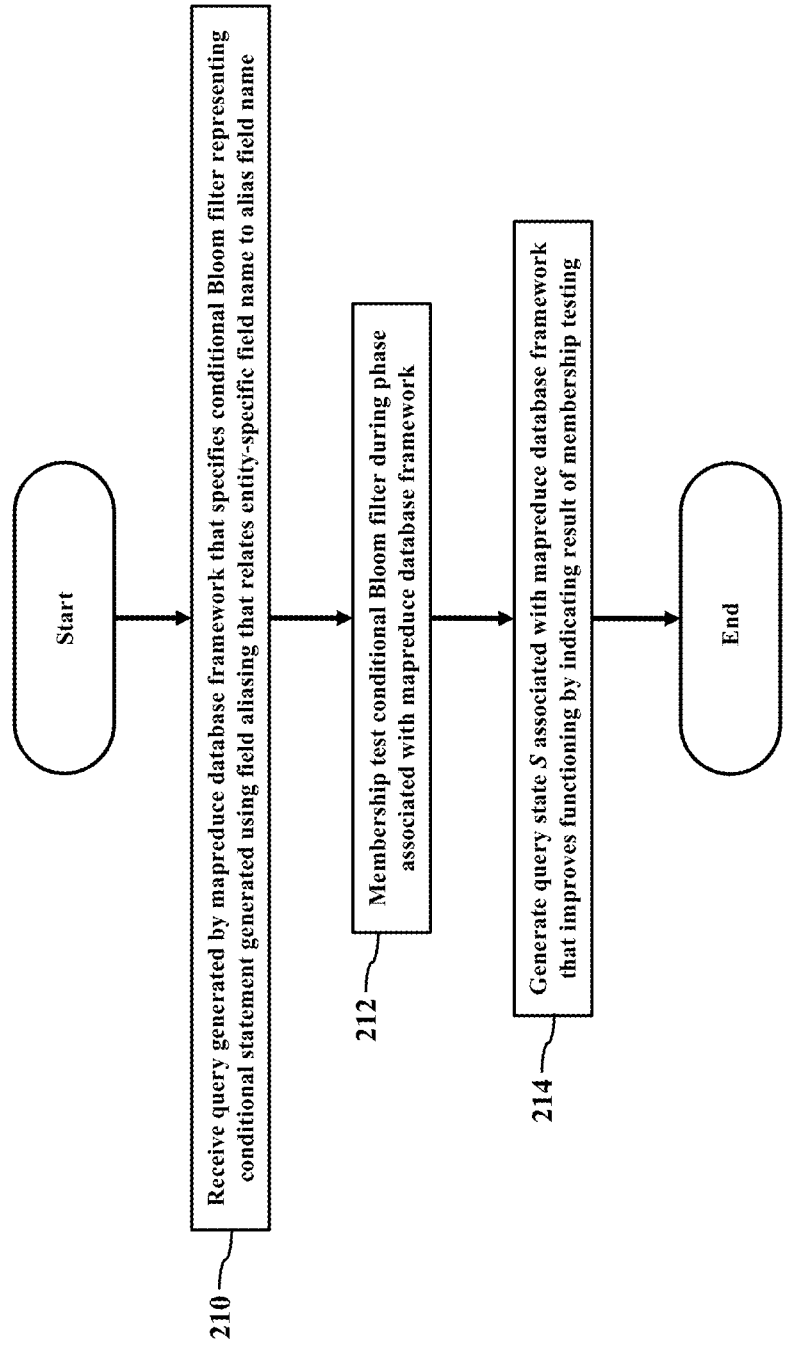

FIG. 14 illustrates more examples of a method or operations that improve functioning by using the conditional Bloom filter 80. The computer system 24 receives a query (such as the aliased database query 60) generated by the mapreduce database framework 120 that specifies the conditional Bloom filter 80 representing the conditional statement 74 generated using the field aliasing 22 that relates the entity-specific field names 62 to the corresponding alias field names 64 (Block 210). The computer system 24 membership tests bits representing the conditional Bloom filter 80 during the phase (such as 122 and/or 124) associated with the mapreduce database framework 120 to the alias-specific Bloom filter 96 representing the cybersecurity data logs 160 associated with the alias field names 64 (Block 212). The computer system 24 generates the query state S (illustrated as reference numeral 100) associated with the mapreduce database framework 120 that improves the functioning by indicating a result of the membership testing 90 of the conditional Bloom filter 80 (Block 214).

Figure 15:
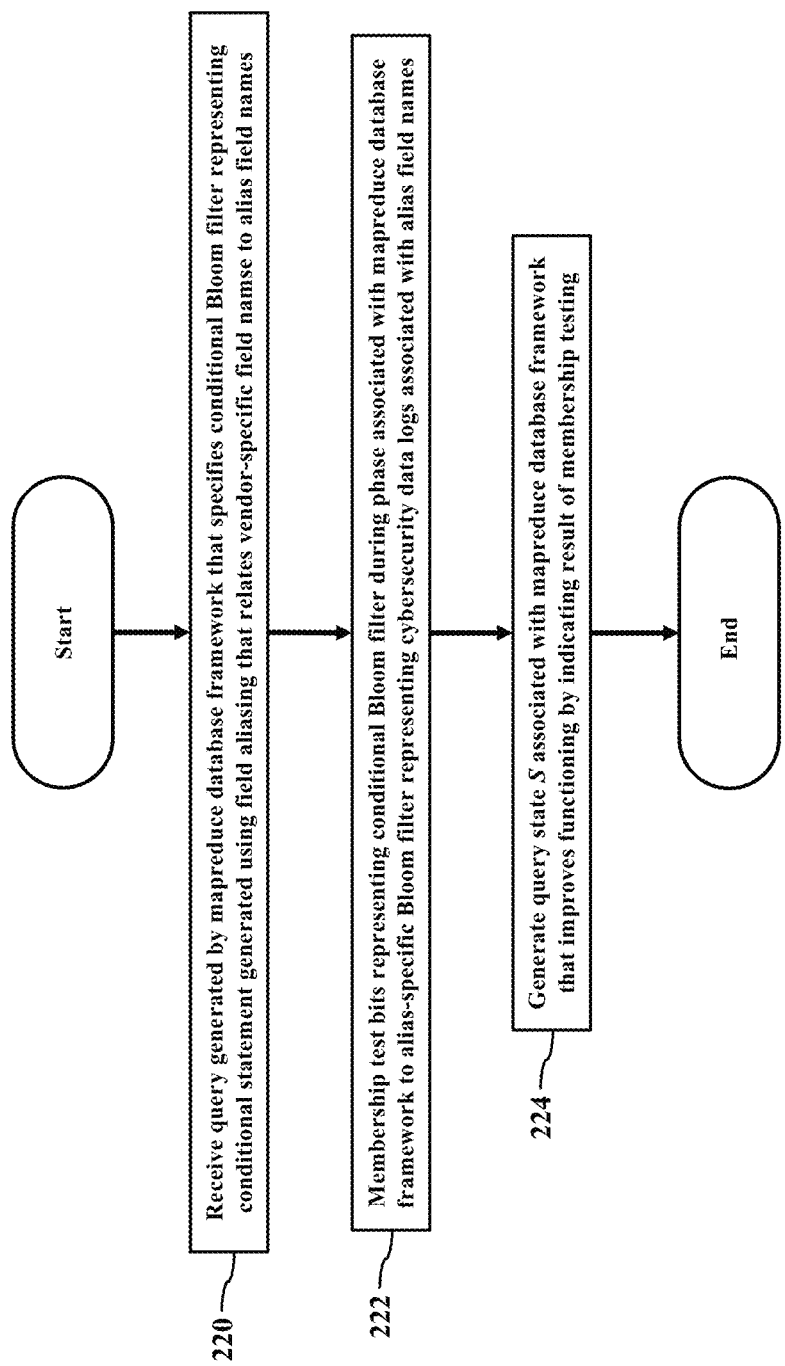

FIG. 15 illustrates still more examples of a method or operations that improve functioning by using the conditional Bloom filter 80. The computer system 24 receives a query (such as the aliased database query 60) generated by the mapreduce database framework 120 that specifies the conditional Bloom filter 80 representing the conditional statement 74 generated using the field aliasing 22 that relates the vendor-specific field name 60 to the corresponding alias field name 64 (Block 220). Bits representing the conditional Bloom filter 80 are membership testing during the phase (such as 122 and/or 124) associated with the mapreduce database framework 120 to the alias-specific Bloom filter 96 representing the cybersecurity data logs 160 associated with the corresponding alias field names 64 (Block 222). The computer system 24 associated with the mapreduce database framework 120 generates the query state 100 that improves the functioning by indicating a result of the membership testing 90 of the bits representing the conditional Bloom filter 80 to the alias-specific Bloom filter 96 (Block 224).

Figure 16:
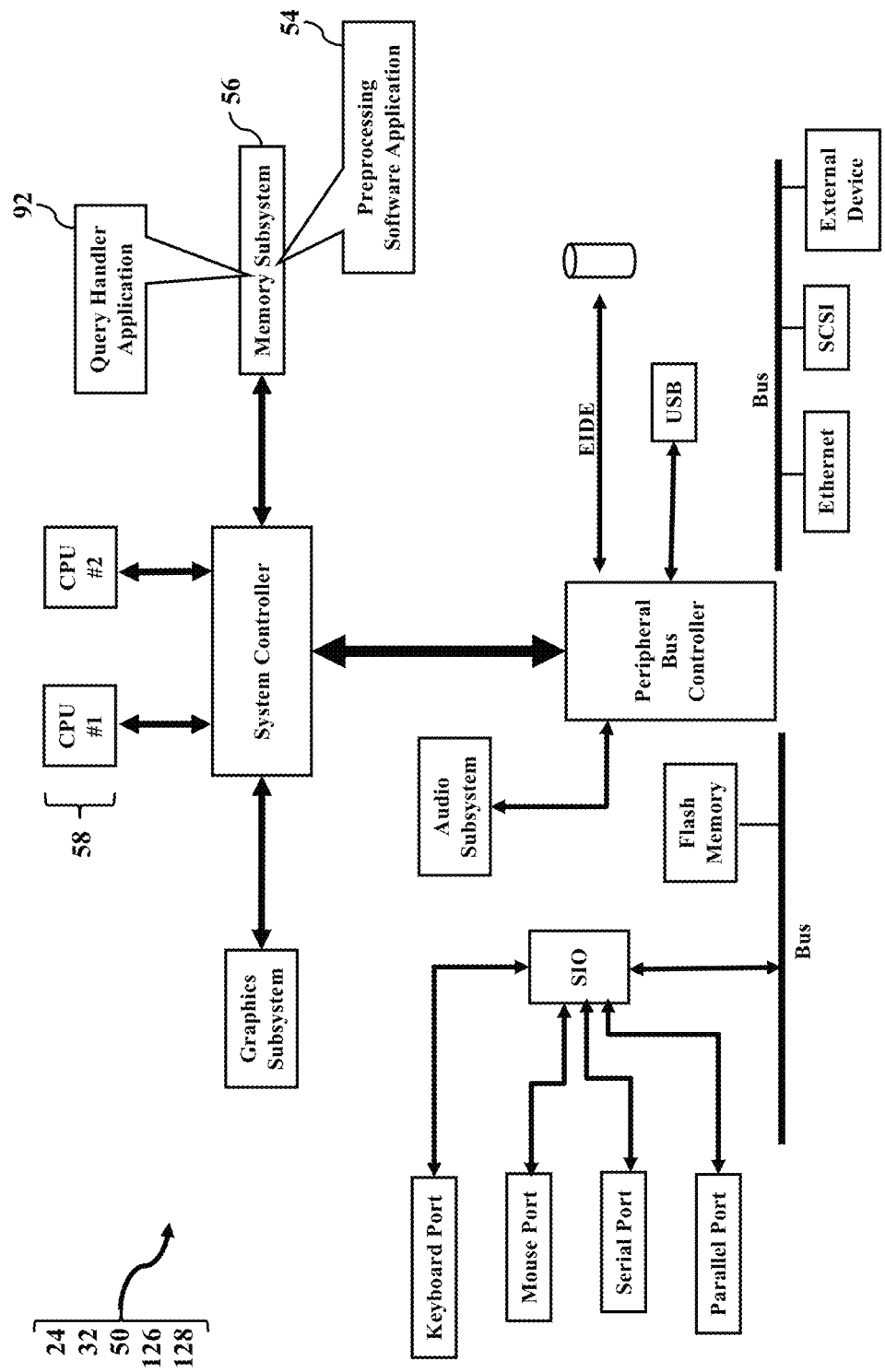
FIG. 16 illustrates a more detailed example of the operating environment.

FIG. 16 illustrates a more detailed example of the operating environment. FIG. 16 is a more detailed block diagram illustrating the computer system 24. The computer system 24 may represent the node 32, the rack server 50, the coordinator server 126, and the worker 128. The preprocessing software application 54 and the query handler application 92 are stored in the memory subsystems or devices 56. One or more of the processors/cores 58 communicate with the memory subsystem or device 56 and execute the preprocessing software application 54 and the query handler application 92. Examples of the memory subsystem or device 28 may include Dual In-Line Memory Modules (DIMMs), Dynamic Random Access Memory (DRAM) DIMMs, Static Random Access Memory (SRAM) DIMMs, non-volatile DIMMs (NV-DIMMs), storage class memory devices, Read-Only Memory (ROM) devices, compact disks, solid-state, and other read/write memory technology. Because the computer system 24 is known to those of ordinary skill in the art, no detailed explanation is needed.

The computer system 24 may have other embodiments. This disclosure mostly discusses the computer system 24 as the node 32, the rack server 50, the coordinator server 126, and the worker 128. The preprocessing software application 54 and the query handler application 92, however, may be easily adapted to other operating environments, such as a switch, router, or other network member of the computing cluster 34. The preprocessing software application 54 and the query handler application 92 may also be easily adapted to other devices, such as where the computer system 24 may be a laptop computer, a smartphone, a tablet computer, or a smartwatch. The preprocessing software application 54 and the query handler application 92 may also be easily adapted to other embodiments of smart devices, such as a television, an audio device, a remote control, and a recorder. The preprocessing software application 54 and the query handler application 92 may also be easily adapted to still more smart appliances, such as washers, dryers, and refrigerators. Indeed, as cars, trucks, and other vehicles grow in electronic usage and in processing power, the preprocessing software application 54 and the query handler application 92 may be easily incorporated into a vehicular controller.

The field aliasing 22 and the conditional Bloom filter 80 may be applied regardless of the networking environment.

The field aliasing 22 and the conditional Bloom filter 80 may be easily adapted to stationary or mobile devices having wide-area networking (e.g., 4G/LTE/5G cellular), wireless local area networking (WI-FI®), near field, and/or BLUETOOTH® capability. The field aliasing 22 and the conditional Bloom filter 80 may be applied to stationary or mobile devices utilizing a portion of the electromagnetic spectrum and a signaling standard (such as the IEEE 802 family of standards, GSM/CDMA/TDMA or other cellular standard, and/or the ISM band). The field aliasing 22 and the conditional Bloom filter 80, however, may be applied to a processor-controlled device operating in the radio-frequency domain and/or the Internet Protocol (IP) domain. The field aliasing 22 and the conditional Bloom filter 80 may be applied to a processor-controlled device utilizing a distributed computing network, such as the Internet (sometimes alternatively known as the "World Wide Web"), an intranet, a local-area network (LAN), and/or a wide-area network (WAN). The field aliasing 22 and the conditional Bloom filter 80 may be applied to a processor-controlled device utilizing power line technologies, in which signals are communicated via electrical wiring. Indeed, the many examples may be applied regardless of physical componentry, physical configuration, or communications standard(s).

The computer system 24 may utilize a processing component, configuration, or system. For example, the field aliasing 22 and the conditional Bloom filter 80 may be easily adapted to a desktop, mobile, or server central processing unit or chipset offered by INTEL®, ADVANCED MICRO DEVICES®, ARM®, APPLE®, TAIWAN SEMICONDUCTOR MANUFACTURING®, QUALCOMM®, or other manufacturer. The computer system 24 may even use multiple central processing units or chipsets, which could include distributed processors or parallel processors in a single machine or multiple machines. The central processing unit or chipset can be used in supporting a virtual processing environment. The central processing unit or chipset could include a state machine or logic controller. When the central processing units or chipsets execute instructions to perform "operations," this could include the central processing unit or chipset performing the operations directly and/or facilitating, directing, or cooperating with another device or component to perform the operations.

The computer system 24 may use packetized communications. When the computer system 24 communicates via the cloud computing network/environment 40 (illustrated in FIG. 1), information may be collected, sent, and retrieved. The information may be formatted or generated as packets of data according to a packet protocol (such as the Internet Protocol). The packets of data contain bits or bytes of data describing the contents, or payload, of a message. A header of each packet of data may be read or inspected and contain routing information identifying an origination address and/or a destination address.

The cloud computing network/environment 40 may utilize a signaling standard. The cloud computing network/environment 40 and/or the computer cluster 34 may mostly use wired networks to interconnect the network members. However, the computing network/environment 40 and/or the computer cluster 34 may utilize a communications device using the Global System for Mobile (GSM) communications signaling standard, the Time Division Multiple Access (TDMA) signaling standard, the Code Division Multiple Access (CDMA) signaling standard, the "dual-mode" GSM-ANSI Interoperability Team (GAIT) signaling standard, or other variant of the GSM/CDMA/TDMA signaling standard. The computing network/environment 40 and/or the computer cluster 34 may also utilize other standards, such as the I.E.E.E. 802 family of standards, the Industrial, Scientific, and Medical band of the electromagnetic spectrum, BLUETOOTH®, low-power or near-field, and other standard or value.

The field aliasing 22 and the conditional Bloom filter 80 may be physically embodied on or in a computer-readable storage medium. This computer-readable medium, for example, may include CD-ROM, DVD, tape, cassette, floppy disk, optical disk, memory card, memory drive, and large-capacity disks. This computer-readable medium, or media, could be distributed to end-subscribers, licensees, and assignees. A computer program product comprises processor-executable instructions for implementing the field aliasing 22 and the conditional Bloom filter 80, as the above paragraphs explain.

The diagrams, schematics, illustrations, and the like represent conceptual views or processes illustrating examples of the field aliasing 22 and the conditional Bloom filter 80. The functions of the various elements shown in the figures may be provided through the use of dedicated hardware as well as hardware capable of executing instructions. The hardware, processes, methods, and/or operating systems described herein are for illustrative purposes and, thus, are not intended to be limited to a particular named manufacturer or service provider.

As used herein, the singular forms "a," "an," and "the" are intended to include the plural forms as well, unless expressly stated otherwise. It will be further understood that the terms "includes," "comprises," "including," and/or "comprising," when used in this Specification, specify the presence of stated features, integers, steps, operations, elements, and/or components, but do not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements may be present. Furthermore, "connected" or "coupled" as used herein may include wirelessly connected or coupled. As used herein, the term "and/or" includes any and all combinations of one or more of the associated listed items.

It will also be understood that, although the terms first, second, and so on, may be used herein to describe various elements, these elements should not be limited by these terms. These terms are only used to distinguish one element from another. For example, a first computer or container could be termed a second computer or container and, similarly, a second device could be termed a first device without departing from the teachings of the disclosure.

The invention claimed is:

1. A memory device storing instructions that, when executed by at least one central processing unit, perform operations, the operations comprising:
   receiving an aliased database query generated by a mapreduce database framework to represent a conditional statement using field aliasing that relates vendor-specific field names to corresponding alias field names;
   membership testing, during a phase associated with the mapreduce database framework, bits representing a conditional Bloom filter representing the conditional statement to an alias-specific Bloom filter representing cybersecurity data logs associated with the corresponding alias field names; and
   generating a query state by the mapreduce database framework by using the membership testing of the bits representing the conditional Bloom filter to the alias-specific Bloom filter.

2. The memory device of claim 1, wherein the operations further comprise generating the conditional Bloom filter by a node performing a coordinator role associated with the mapreduce database framework.

3. The memory device of claim 1, wherein the operations further comprise executing the field aliasing by a node performing a coordinator role associated with the mapreduce database framework.

4. The memory device of claim 1, wherein the operations further comprise commencing a timer associated with the mapreduce database framework.

5. The memory device of claim 3, wherein the operations further comprise generating the aliased database query as the timer increments.

6. The memory device of claim 3, wherein the operations further comprise executing the field aliasing as the timer increments.

7. A method executed by a computer system, comprising:
   receiving, by the computer system, an aliased database query generated by a mapreduce database framework to represent a conditional statement using field aliasing that relates vendor-specific field names to corresponding alias field names;
   membership testing, by the computer system, during a phase associated with the mapreduce database framework, bits representing a conditional Bloom filter representing the conditional statement to an alias-specific Bloom filter representing cybersecurity data logs associated with the corresponding alias field names; and
   generating, by the computer system, a query state by the mapreduce database framework by using the membership testing of the bits representing the conditional Bloom filter to the alias-specific Bloom filter.

8. The method of claim 7, further comprising generating the conditional Bloom filter by performing a coordinator role associated with the mapreduce database framework.

9. The method of claim 7, further comprising executing the field aliasing by performing a coordinator role associated with the mapreduce database framework.

10. The method of claim 7, further comprising commencing a timer associated with the mapreduce database framework.

11. The method of claim 10, further comprising generating the aliased database query as the timer increments.

12. The method of claim 10, further comprising executing the field aliasing as the timer increments.

13. At least one computer system, comprising:
    at least one central processing unit; and
    at least one local memory device storing instructions that, when executed by the at least one central processing unit, perform operations comprising:
    receiving an aliased database query generated by a mapreduce database framework to represent a conditional statement using field aliasing that relates vendor-specific field names to corresponding alias field names;
    membership testing, during a phase associated with the mapreduce database framework, bits representing a conditional Bloom filter representing the conditional statement to an alias-specific Bloom filter representing cybersecurity data logs associated with the corresponding alias field names; and generating a query state by the mapreduce database framework by using the membership testing of the bits representing the conditional Bloom filter to the alias-specific Bloom filter.

14. The at least one computer system of claim 13, wherein the operations further comprise generating the conditional Bloom filter while performing a coordinator role associated with the mapreduce database framework.

15. The at least one computer system of claim 13, wherein the operations further comprise executing the field aliasing while performing a coordinator role associated with the mapreduce database framework.

16. The at least one computer system of claim 13, wherein the operations further comprise commencing a timer associated with the mapreduce database framework.

17. The at least one computer system of claim 16, wherein the operations further comprise generating the aliased database query as the timer increments.

18. The at least one computer system of claim 16, wherein the operations further comprise executing the field aliasing as the timer increments.

19. The at least one computer system of claim 16, wherein the operations further comprise stopping the timer in response to the generating of the query state by the mapreduce database framework.

20. The at least one computer system of claim 13, wherein the operations further comprise standardizing the cybersecurity data logs using the field aliasing that relates the vendor-specific field names to the corresponding alias field names.

* * * * *